United States Patent
Apte et al.

(10) Patent No.: US 11,610,031 B2
(45) Date of Patent: Mar. 21, 2023

(54) 3D-LINK FOR SHARING A 3D CONTEXT OF 3D COMPUTER- AIDED DESIGN (CAD) MODEL

(71) Applicant: Dassault Systemes SolidWorks Corporation, Waltham, MA (US)

(72) Inventors: Makarand Apte, Pune (IN); Shrikant Vitthal Savant, Shrewsbury, MA (US); Jody Todd Stiles, Northborough, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 243 days.

(21) Appl. No.: 17/062,212

(22) Filed: Oct. 2, 2020

(65) Prior Publication Data
US 2021/0312099 A1    Oct. 7, 2021

(30) Foreign Application Priority Data
Apr. 2, 2020  (IN) .............................. 202021014747

(51) Int. Cl.
*G06F 30/13* (2020.01)
*G06T 19/20* (2011.01)

(52) U.S. Cl.
CPC .............. *G06F 30/13* (2020.01); *G06T 19/20* (2013.01); *G06T 2219/2004* (2013.01)

(58) Field of Classification Search
CPC ...... G06F 30/13; G06F 2111/02; G06F 30/10; G06F 30/12; G06T 19/20;
(Continued)

(56) References Cited

U.S. PATENT DOCUMENTS

2004/0250236 A1  12/2004  O'Malley et al.
2014/0095122 A1*  4/2014  Appleman ............ G06T 19/003
                                                            703/1
(Continued)

FOREIGN PATENT DOCUMENTS

JP    2004334875 A    11/2004
JP    2006338065 A    12/2006

OTHER PUBLICATIONS

Extended European Search Report for EP Application No. 21166818 1, entitled "3D-LINK," dated Aug. 18, 2021.
(Continued)

*Primary Examiner* — Eunhee Kim
(74) *Attorney, Agent, or Firm* — Hamilton, Brook, Smith & Reynolds, P.C.

(57) ABSTRACT

A computer-aided design (CAD) system and corresponding method enable users to manage and share information related to a three-dimensional (3D) context of a 3D CAD model with ease. The method creates a 3D-link targeting the 3D context. The 3D-link includes a static link and a variable link. The static link re-directs to the variable link in response to a user opening the 3D-link. The variable link enables (i) the 3D CAD model to be located and opened and (ii) the 3D context to be displayed within the 3D CAD model. The method stores the 3D-link in a database. The 3D-link enables the 3D context to be shared between or among users via sharing of the 3D-link from the database. The 3D-link plays an important role in helping design engineers collaborate by eliminating the need to create pictures or copies of 3D models that may become outdated.

20 Claims, 14 Drawing Sheets

(58) Field of Classification Search
CPC ....... G06T 2219/2004; G06T 2219/024; G06T 19/00; G06T 17/00
See application file for complete search history.

(56) References Cited

U.S. PATENT DOCUMENTS

| | | | |
|---|---|---|---|
| 2017/0116352 A1* | 4/2017 | Kohlhoff | G06F 30/00 |
| 2017/0132567 A1* | 5/2017 | Glunz | G06F 30/13 |
| | | | 703/1 |
| 2017/0315696 A1* | 11/2017 | Jacobson | F24F 11/52 |
| | | | 715/739 |

OTHER PUBLICATIONS

European Search Report for EP Application No. 21166818.1, entitled "3D-LINK," dated Aug. 10, 2021.

* cited by examiner

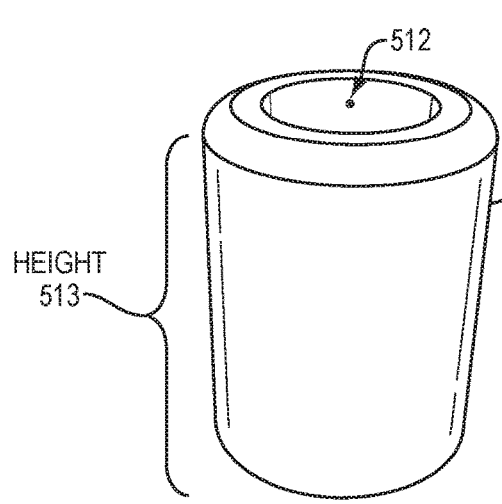
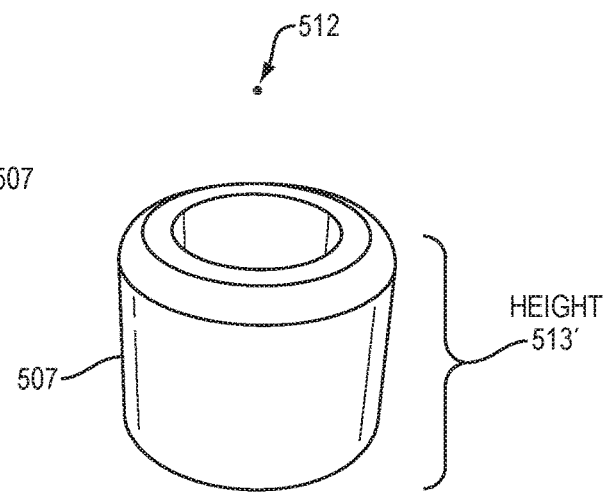
FIG. 5A  FIG. 5B
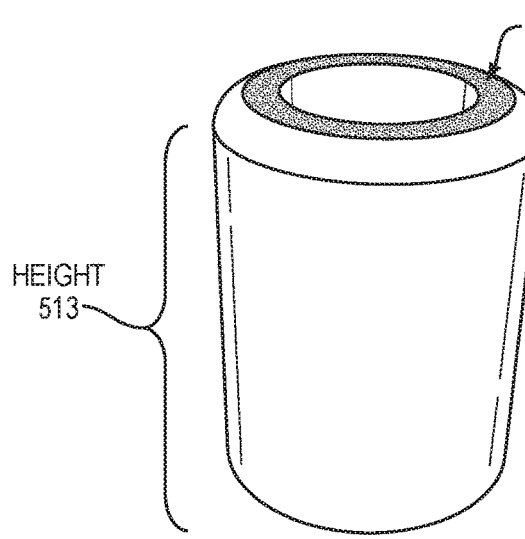
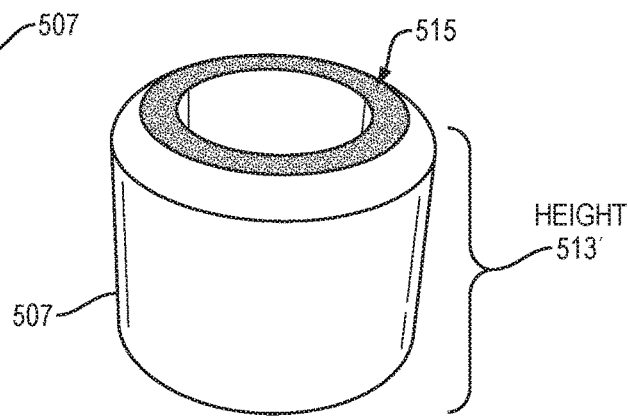
FIG. 5C  FIG. 5D

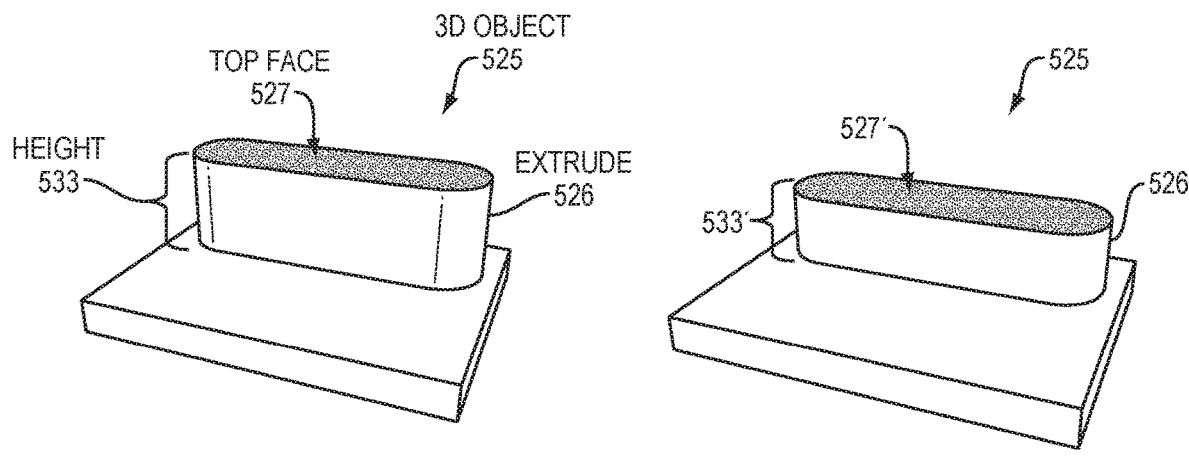
FIG. 5E
FIG. 5F
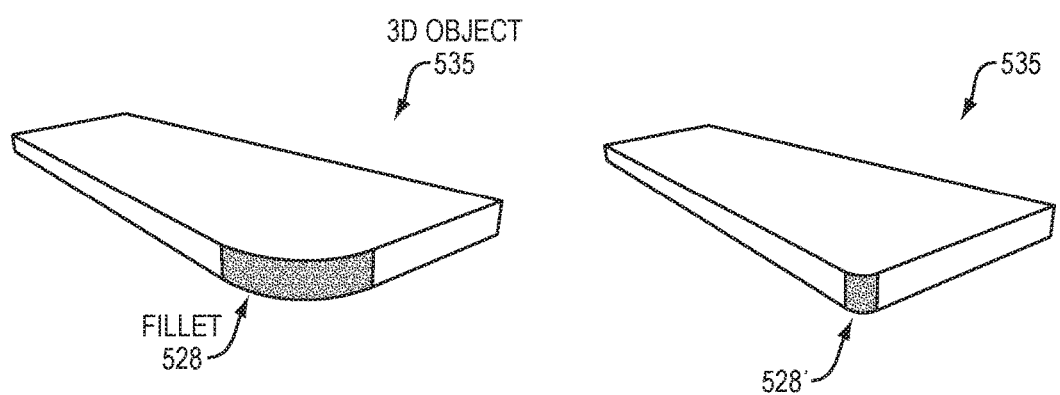
FIG. 5G
FIG. 5H

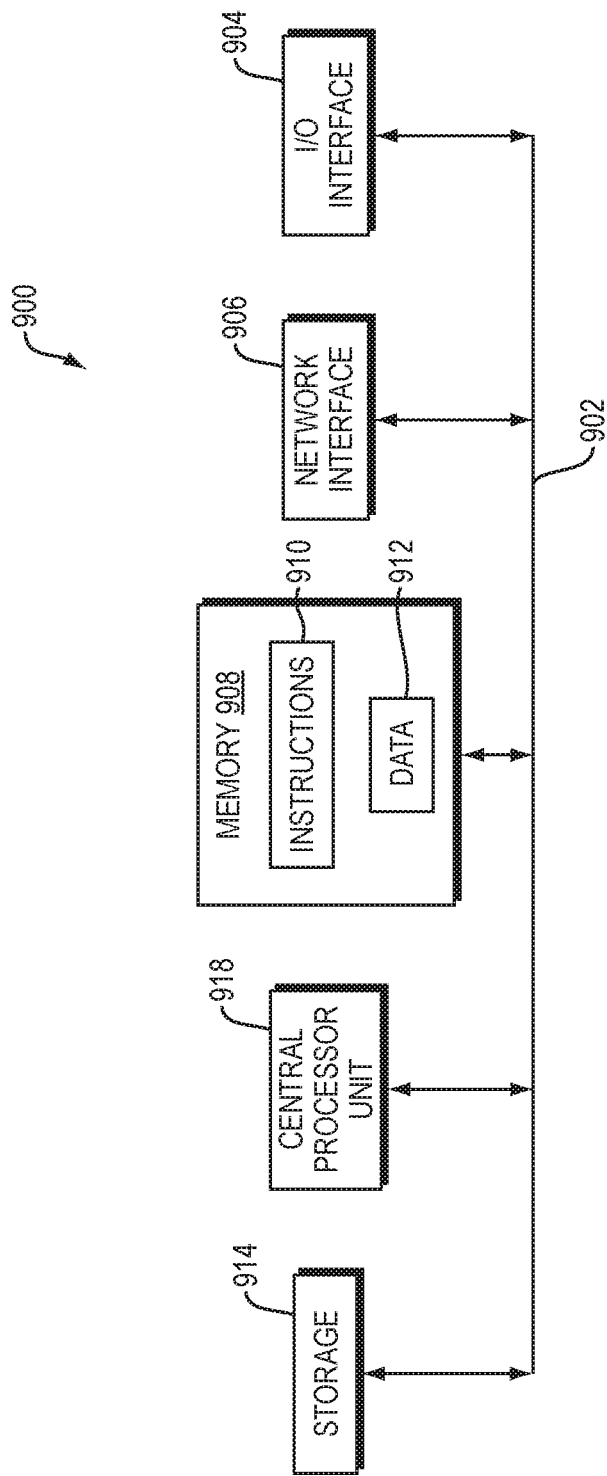

3D-LINK FOR SHARING A 3D CONTEXT OF 3D COMPUTER-AIDED DESIGN (CAD) MODEL

RELATED APPLICATIONS

This application claims priority under 35 U.S.C. § 119 or 365 to Indian Provisional Application No. 202021014747, filed on Apr. 2, 2020. The entire teachings of the above application are incorporated herein by reference.

BACKGROUND

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, faces, etc.). The topological entities have corresponding supporting geometrical entities, such as points, trimmed curves, and trimmed surfaces that correspond to the topological faces bounded by the edges. 3D CAD systems may combine solid modeling and other modeling techniques, such as parametric modeling techniques, for use in constructing and manipulating 3D models. Parametric modeling techniques can be used to define various parameters for different features and components of a model, and to define relationships between those features and components based on relationships between the various parameters. A typical user of such a 3D CAD system may be referred to as a design engineer.

The design engineer designs physical and aesthetic aspects of 3D models, and is skilled in 3D modeling techniques. The following are definitions of certain terms that can be used when describing a 3D CAD system that may be used by such a design engineer to design a 3D model.

- 3D model: A 3D model refers to representations of solid geometries in a CAD program. A modeled object may contain none or one or more 3D solids and may contain none or one or more sketches.
- Assembly: A collection of parts and components that form a possibly complex modeled object such as a car or airplane. In a CAD program, an assembly is represented by a document in which parts, features, and other assemblies (subassemblies) are mated together. Parts and subassemblies can exist in documents separate from the assembly.
- Attribute: Most modern CAD programs have a provision to attach attributes to any geometric entity. The attributes can contain any additional data that may be relevant to the geometric entity.
- Body: A solid body includes topological data and geometric data. The topological data (e.g., faces, edges, vertices, etc.) in a solid body have corresponding geometric data in the same solid body. Each vertex corresponds to a point. Each edge corresponds to a curve. Each face corresponds to a surface.
- Component (with respect to a 3D model): Any part or subassembly within an assembly.
- Edge: A single outside boundary of a feature.
- Entity: A discrete element, such as a face, edge, vertex, etc.
- Face: A selectable area (planar or otherwise) of a model or surface with boundaries that help define the shape of the model or surface. For example, a rectangular solid has six faces and a cylindrical solid has three faces.
- Feature: An individual shape that, combined with other features, makes up a part or assembly. A 3D model is modified by creating CAD features, such as fillets, chamfers, extrudes, cuts, holes, angled drafts, etc. A feature may be referred to interchangeably herein as a CAD feature.
- Feature node: A representation of a feature in a feature tree is called a feature node. Most modern CAD programs associate a unique identifier, such as a number or an alphanumeric text, with each feature node. A feature tree may be referred to interchangeably herein as a specification tree or simply, a tree.
- Feature tree (i.e., specification tree or tree): In conventional CAD programs, the features in a 3D model are organized in the form of a tree, called a feature tree or specification tree, that lists each feature and defines how the feature relates to higher and lower level features in the tree.
- Geometric Entity: A geometric entity may refer to a feature node or some entity within a CAD feature, such as a line, curve, plane, surface, etc. Most modern CAD programs associate a unique identifier with each geometric entity. The unique identifier may be a number or an alphanumeric text.
- Large Design Review: A mode of assembly review that allows a very large assembly to open quickly while still retaining capabilities that are useful when conducting design reviews of assemblies. In large design review mode, a user can, for example, navigate a design tree of the assembly, measure distances, create cross sections, hide and show components, and create, edit, and play back walk-throughs. Large design review mode can also be referred to as "Graphics Mode."
- Part: A single 3D object made up of features. A part can include multiple bodies. A part can become a component in an assembly. Examples of parts include, for example, a bolt, pin, plate, etc.
- Plane: A flat construction geometry.
- Point: A singular location in a 3D model.
- Resolved: A state of an assembly component that is fully loaded in memory. When resolved, all of the component's model data is available, so its entities can be selected, referenced, edited, etc.
- Subassembly: An assembly that is part of a larger assembly. For example, a steering mechanism of a car is a subassembly of the car.
- Surface: A zero-thickness planar or 3D entity with edge boundaries.
- Vertex: A point at which two or more edges intersect. Vertices can be selected for sketching, dimensioning, and other CAD operations.

As disclosed above, a CAD system may be a solid modeling system that is a feature-based 3D CAD system, wherein a 3D model of a part may be constructed using various features, such as bosses, fillets, chamfers, cuts, holes, shells, lofts, sweeps, etc. CAD systems store the contents of parts, subassemblies, and assemblies in a data file(s) that may be referred to as a CAD data file(s). In addition to features, the contents of such CAD data file(s) may include design profiles, layouts, internal components (e.g., bodies), and graphical entities. Over the course of design of a 3D model, design engineers may collaborate with one another on aspects of such CAD data files.

SUMMARY

Embodiments of the present invention provide an efficient and advantageous mechanism for CAD users (e.g., design engineers) to collaborate over a 3D model. In particular, embodiments provide a 3D link that communicates with ease a reference point context of a model part or element (referred to as the 3D context) including the relative 3D space location and orientation of a subject component of a CAD model. In this way, embodiments of the present invention improve accuracy of communications and hence collaboration over a subject CAD model among CAD users.

According to an example embodiment, a computer-implemented method for sharing a three-dimensional (3D) context of a 3D computer-aided design (CAD) model comprises creating a 3D-link targeting the 3D context within the 3D CAD model. The creating includes forming a static link (also referred to interchangeably herein as an "external link" or "external 3D-link") and a variable link (also referred to herein as an "internal link" or "internal 3D-link"). The static link is configured to re-direct to the variable link in response to a user opening the 3D-link. The variable link enables (i) the 3D CAD model to be located and opened and (ii) the 3D context to be displayed within the 3D CAD model. The method further comprises storing the 3D-link in a database, the 3D-link enabling the 3D context to be shared between or among users via sharing of the 3D-link from the database.

Features of the 3D CAD model may be organized in a feature tree. The feature tree may include a 3D-link feature for the 3D-link created. The 3D-link feature enables editing of placement of a 3D-link indicator, representing the 3D-link within the 3D CAD model, to change the 3D context targeted, enables editing of at least one requirement of the 3D-link, provides a rollback point in a history of the 3D CAD model, enables storage of user-editable information related to the 3D context, or a combination thereof.

The 3D CAD model is associated with a coordinate system. The 3D context may be a fixed 3D point specified by x, y, and z coordinates expressed in the coordinate system of the 3D CAD model.

The 3D-link may be expressed as a text string, the 3D context may be a geometric entity of the 3D CAD model, the static link may be smaller relative to the variable link, or a combination thereof.

The geometric entity may include: a feature in the 3D CAD model, geometry belonging to the feature, reference plane included in the 3D CAD model, reference line included in the 3D CAD model, reference point included in the 3D CAD model, sketch included in the 3D CAD model, dimension element on the sketch or on a 3D solid included in the 3D CAD model, annotation element on the sketch or on the 3D solid, or a combination thereof.

The computer-implemented method may further comprise storing the 3D CAD model in the database storing the 3D link. Forming the static link may include concatenating a database address of the database and a unique identifier of the variable link.

The database may be a 3D-link database specific to or dedicated to storing 3D links of one or more 3D CAD models, for non-limiting example. The 3D CAD model may be stored in a 3D CAD model database. Forming the static link may include concatenating a database address of the 3D-link database and a unique identifier of the variable link. The variable link may include a model address of the 3D CAD model stored in the 3D CAD model database.

The 3D CAD model database may be a cloud-based database, server, or computer.

Forming the variable link may include concatenating: a model address including an address of the 3D CAD model and (i) a core 3D address of the 3D context within the 3D CAD model, the core 3D address being relative to the model address, or (ii) a unique identifier of a 3D-link attribute or 3D-link feature, wherein the core 3D address is included as meta-data within the 3D-link attribute or 3D-link feature. The 3D-link attribute may be attached onto a 3D point or geometric entity of the 3D CAD model.

Forming the variable link may further include concatenating at least one view parameter or including the at least one view parameter in the meta-data, the at least one view parameter defining a pose of a virtual camera, view condition, or a combination thereof. The at least one view parameter is optional because a user may open the 3D model in a "default view."

The model address may further include an identifier of a web-based CAD application within which the 3D CAD model is to be opened in response to opening of the 3D-link. It should be understood, however, that the identifier is not limited to an identifier of a web-based CAD application and that the 3D CAD model is not limited to being opened by a web-based CAD application.

The computer-implemented method may further comprise enabling a user to specify that the 3D-link is to be locked to a given version or revision of the 3D CAD model. In an event the 3D-link is specified to be locked, the model address may further include the given version of revision of the 3D CAD model.

The storing may include entering the 3D-link into the database as a key-value pair, wherein the key-value pair includes a key and a value, wherein the static link is the key, and wherein the variable link is the value of the key-value pair.

In an event a change is made to the 3D CAD model following creation of the 3D-link, the computer-implemented method may further comprise updating the variable link, automatically, in response to the change made, prompting for user input in an event the change causes the 3D context to become invalid, or a combination thereof.

According to another example embodiment, a CAD system is configured to open a 3D computer-aided design (CAD) model and enable a user to select a 3D context of the 3D CAD model opened. The CAD system is further configured to create a 3D-link targeting the 3D context. The 3D-link includes a static link and a variable link. The static link is configured to re-direct to the variable link in response to opening of the 3D-link. The variable link enables (i) the 3D CAD model to be located and opened and (ii) the 3D context to be displayed within the 3D CAD model. The CAD system is further configured to store the 3D-link in a 3D-link database that is communicatively coupled to the CAD system. The 3D-link enables the 3D context to be shared between or among users via sharing of the 3D-link from the 3D-link database.

The CAD system may include a display screen configured to display the 3D CAD model opened. The 3D context may be a 3D point or geometric entity, and wherein, to enable the user to select the 3D context, the CAD system may be further configured to enable the user to drop a pin, flag, or bookmark icon (generally indicia) onto the 3D point or geometric entity, the 3D point or geometric entity displayed on the display screen.

The CAD system may be further configured to attach a 3D-link attribute onto the 3D point or geometric entity or reference the 3D point or geometric entity via a 3D-link feature for the 3D-link, the 3D-link feature included in a feature tree of the 3D CAD model.

The static link may be a text string and the CAD system may be further configured to add the text string of the static link as meta-data to the 3D-link attribute or 3D-link feature, enabling the static link to be used as a key for accessing the variable link in the 3D-link database.

The CAD system may include a display screen configured to display the 3D CAD model opened. The CAD system may be further configured to form the variable link by concatenating: a model address including an address of the 3D CAD model and (i) a core 3D address of the 3D context within the 3D CAD model, the core 3D address being relative to the model address, or (ii) a unique identifier of a 3D-link attribute or 3D-link feature, wherein the core 3D address is included as meta-data within the 3D-link attribute or 3D-link feature. The 3D-link attribute may be attached onto a 3D point or geometric entity of the 3D CAD model.

The CAD system may be further configured to store the 3D-link in the 3D-link database by entering the 3D-link into the 3D-link database as a key-value pair. The key-value pair includes a key and a value, wherein the static link is the key and wherein the variable link is the value of the key-value pair.

The 3D CAD model may be stored in a 3D CAD model database. The 3D-link database and 3D CAD model database may be hosted by a common cloud environment. The CAD system may be configured to access the 3D-link database using a given user authentication, the given user authentication used to open a 3D CAD model stored in the 3D CAD model database.

Alternative system embodiments parallel those described above in connection with the example method embodiment.

According to an example embodiment, a non-transitory computer-readable medium for navigating to a target of a three-dimensional (3D)-link from within a computer-aided design (CAD) application has encoded thereon a sequence of instructions which, when loaded and executed by at least one processor, causes the at least one processor to split the 3D-link into a plurality of operative or logical component portions. The plurality of operative/logical components may include a model address, core 3D address, and view parameters. The sequence of instructions may further cause the at least one processor to use the model address to access a 3D CAD model, open the 3D CAD model accessed, and display the 3D CAD model within the CAD application with a pose of a camera and view conditions set in accordance with the view parameters. The sequence of instructions may further cause the at least one processor to navigate to the target of the 3D-link by displaying an icon at a geometric entity or 3D point of the 3D CAD model or by otherwise highlighting the geometric entity or 3D point. The geometric entity or 3D point may be specified by the core 3D address.

The 3D CAD model may be associated with a coordinate system. The 3D point may be a fixed 3D point specified by x, y, and z coordinates expressed in the coordinate system of the 3D CAD model.

The CAD application may be a CAD web application and a name of the CAD web application may be included in the model address. The CAD web application may be selected based on a type of the 3D CAD model or meta-data associated with the 3D CAD model. It should be understood, however, that the CAD application is not limited to a web application.

The CAD application may be selected based on a type of the 3D CAD model or meta-data associated with the 3D CAD model.

The 3D-link may be expressed as a text string. The 3D-link may be provided to the CAD application via an input field of the CAD application, the input field enabling the 3D-link to be entered by a user.

The 3D-link may be provided to the CAD application in response to a user clicking on or otherwise selecting the 3D-link from within another application. The clicking/user selection may cause a web browser to establish a connection to a server and provide the 3D-link to the server. An address of the server may be embedded in the 3D-link and the CAD web application may be opened by the server. In this way, the 3D-link may be implemented using hypertext transfer protocol hyperlink technology or equivalent techniques for non-limiting example.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5A is CAD diagram of an example embodiment of a cylinder with a point that is a target of a 3D-link.

FIG. 5B is a CAD diagram of another example embodiment of the cylinder of FIG. 5A.

FIG. 5C is a CAD diagram of another example embodiment of the cylinder of FIG. 5A with a geometric entity that is the target of the 3D-link.

FIG. 5D is CAD diagram of an example embodiment of the cylinder of FIG. 5C.

FIG. 5E is a CAD diagram of an example embodiment of a 3D object with an extrude.

FIG. 5F is a CAD diagram of an example embodiment of the 3D object of FIG. 5E with the extrude reduced in height.

FIG. 5G is a CAD diagram of an example embodiment of a 3D object with a fillet.

FIG. 5H is a CAD diagram of an example embodiment of the 3D object of FIG. 5G with a new fillet.

FIG. 9 is a block diagram of an example internal structure of a computer optionally within an embodiment disclosed herein

DETAILED DESCRIPTION

Figure 1A:
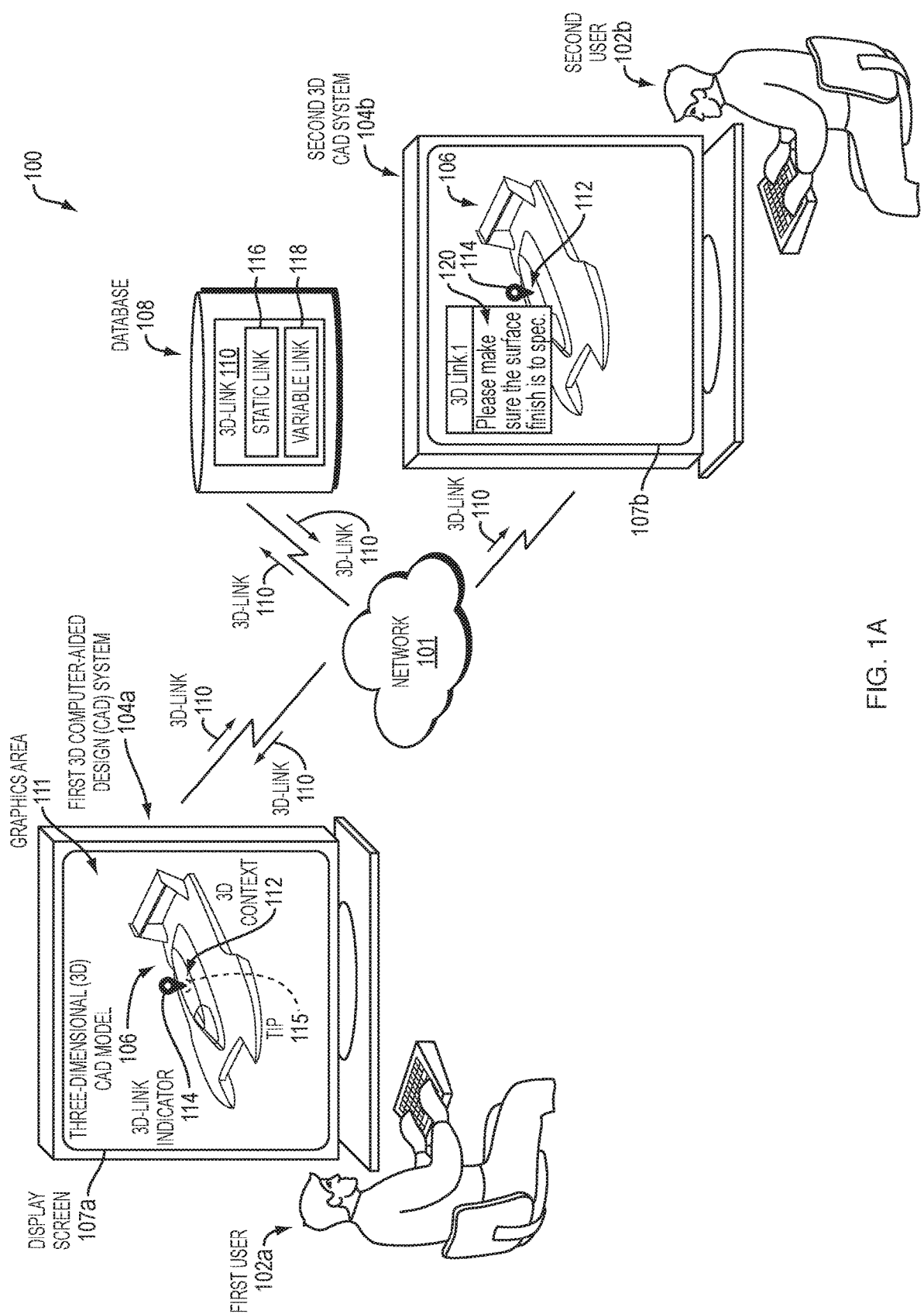
FIG. 1A is a block diagram of an example embodiment of a system.

A description of example embodiments follows.

An example embodiment disclosed herein belongs to any field around product lifecycle management (PLM) that deals with three-dimensional (3D) data. For example, software products used for product design, product review, industrial design, sketching, drawing, and communication apps that allow 3D content may employ an example embodiment of a 3D-link advantageously, as disclosed below. Such software products and communication apps may be included, for example, in a three-dimensional (3D) computer-aided design (CAD) system.

When working collaboratively or with outside suppliers, three-dimensional 3D CAD system users often need to indicate areas of a model component that require changes, need specific treatment, or interface with other components. Drawings and markups can help with communication of same, however, multiple documents are often needed to convey such information. Such documents can become outdated or lost during a development process, resulting in mistakes and/or duplication of effort.

For example, while working collaboratively in a team, or even during simple communication on 3D CAD-related topics, there is often a need for a user, such as a design engineer, to refer to specific geometric entities within a particular 3D CAD model, also referred to interchangeably herein, simply, as a 3D model or model. For example, an employee may want to consult with a manager on how much draft angle needs to be applied to a particular face in a 3D model. With existing systems, the employee may have to take several screenshots of the face in question and send such screenshots to the manager, for example, via electronic mail (email). The problem with such an approach is that a receiver of the screenshots, such as the manager, has to spend time and effort to manually locate the region of interest, such as the particular face in the 3D model, that is captured by the screenshots. This process is tedious and error-prone. Furthermore, the screenshots may become outdated if the master 3D model undergoes any change in the meanwhile.

Some CAD programs allow users to create bookmarks on specific geometric entities. As such, a user can create bookmarks, for example, on the particular face in question, export or save the 3D model to a file, and then send that file by email or file transfer protocol (FTP) to another user, such as the manager. A problem with this approach, however, is that uploading or sending a file may be troublesome, especially if the file size is large, which is frequently the case. Furthermore, the sent files may become outdated if the master 3D model undergoes any change in the meanwhile. Another option for communication is to send instructions over email or phone, such as "navigate to this folder or workspace, then open this 3D model, then go to down to the particular feature named XYZ . . . ," etc. This process is, however, also tedious and error-prone.

An example embodiment disclosed herein provides functionality to allow a user to create a reference to a specific point (e.g., click location), vertex, edge, face, body, or component of a 3D model. This reference may be stored with the 3D model and allows the user to add information, such as a text note, image, video, link to another model, etc., to the reference. Since the reference may be stored with the 3D model, a representation thereof may be displayed in a special folder in a specification/feature tree and may be edited for placement and content, or deleted if no longer relevant. Such a reference may be referred to herein as a 3D-link, also referred to interchangeably herein as a 3D uniform resource locator (3D-URL), for locations inside a 3D model. The representation thereof in the specification/feature tree may be referred to herein as a 3D-link feature.

According to an example embodiment, the 3D-link enables a user to easily manage and share information related to a 3D context (e.g., a specific location and/or geometric entity within a 3D model) in an unambiguous fashion. According to an example embodiment, a 3D-link may be expressed as a cross-platform cross-application universal address that targets or points to a specific location(s) within a 3D model that may be hosted on a cloud, server, or computer. The 3D-link provides a mechanism to share 3D locations between or among users.

While an example embodiment disclosed herein may be described as benefiting a user in a collaborative setting, it should be understood that such benefit is not limited thereto. For example, a single user may create a 3D-link to a location of a 3D model and add notes to it so that they can come back to the 3D model at a later date and recall what they were doing and what needs to be done next.

According to an example embodiment, if the 3D model undergoes a modification before the 3D-link is opened, the 3D-link allows for the necessary mechanisms to keep itself valid, even after such modification. An example embodiment of a 3D-link provides a single source of truth (SSOT). For example, the 3D-link eliminates the need to create pictures or copies of 3D models for communication, which is advantageous, as such pictures/copies may become outdated. According to an example embodiment, the 3D-link maintains a reference, or consistently points, to the master 3D model and, thus, it adheres to the principle of SSOT.

An example embodiment of a 3D-link enables ease of sharing. For example, the 3D-link allows a given user to easily share a specific 3D location (e.g., 3D point or a geometric entity) with another user. The other user, who could be located at a different geographical site relative to the given user, can open the 3D-link on any device, from a potentially different app/application used by the given user, at any time, and the device can open the same 3D model and display the 3D location with the same camera pose and view conditions present at a time of creation of the 3D-link by the given user.

An example embodiment of a 3D-link assists collaboration and can play an important role in helping users collaborate. The 3D-link can accompany any medium, such as a web-page, email, or other medium, and add valuable context to it. For example, a 3D-link disclosed herein may be added to various communication tools, such as emails, chat messages, meeting invites, etc.; added to documentation, such as blogs, wiki pages, slide decks, white papers, etc.; added as a reference inside CAD or PLM data, such as annotations in drawings or 3D models; added as a reference link in a bill of materials (BOM), etc. It should be understood however, that a 3D-link is not limited to being added thereto.

An example embodiment of a 3D-link eases organization of information. For example, a CAD user may have multiple design tasks to perform on different 3D locations in one or more 3D models. According to an example embodiment, the user can create 3D-links to each of those 3D locations and add those 3D-links to their task list. If a user has worked partway on a task for a particular location of a 3D model, then the user can add a note to the 3D-link of that location. At a later point in time, the user can click on (or otherwise user select) the 3D-link, view the note, and pick up from where the user left off.

An example embodiment of a 3D-link provides ease of access, for example, by reducing the entire manual workflow of "navigate to this folder or workspace, then open this 3D model, then go to down to the particular feature named XYZ . . . " to a single click. With the growing popularity of cloud-based CAD systems, an example embodiment of a 3D-link provides a mechanism for users of same to manage and share 3D locations in collaborative work environments, such as disclosed below with regard to FIG. 1A.

FIG. 1A is a block diagram of an example embodiment of a system 100. In the system 100, a first user 102a, such as a design engineer, is using a first 3D computer-aided design (CAD) system 104a and collaborating with a second user 102b on a 3D CAD model 106. It should be understood that the 3D CAD model 106 of FIG. 1A is for illustrative purpose and that a 3D CAD model disclosed herein is not limited thereto. The second user 102b is using a second 3D CAD system 104b that may be a same or different type of 3D CAD system relative to the first 3D CAD system 104a. The first 3D CAD system 104a, second 3D CAD system 104b, and a database 108 are communicatively coupled via a network 101 in the system 100. The network 101 may be any type of network, for example, wired or non-wired, that allows for communications between the first 3D CAD system 104a and second 3D CAD system 104b and further allows the first 3D CAD system 104a and second 3D CAD system 104b to access the database 108. The first 3D CAD system 104a and second 3D CAD system 104b may be referred to, simply, as CAD systems. The 3D CAD model 106 may be referred to, simply, as a CAD model or model. While an example embodiment disclosed herein may be described with regard to the first 3D CAD system 104a or second 3D CAD system 104b, it should be understood that either the first 3D CAD system 104a or second 3D CAD system 104b may employ same. Further, it should be understood that actions disclosed herein with regard to the first user 102a and second user 102 could be performed by either user.

While the database 108 is shown as storing a single 3D-link, that is, the 3D-link 110, it should be understood that the database 108 may store a plurality of 3D-links and that the database 108 may be a distributed or non-distributed database. The database 108 may be any type of database capable of storing a 3D-link, such as a cloud-based database, server, or computer. The database 108 may also be referred to herein as a 3D-link database.

In the example embodiment of FIG. 1A, the first 3D CAD system 104a is configured to open the 3D CAD model 106 and enables the first user 102a to select a 3D context 112 of the 3D CAD model 106 that was opened. The first 3D CAD system 104a is further configured to create the 3D-link 110 that targets the 3D context 112. The first 3D CAD system 104a is further configured to display a 3D-link indicator 114 with a tip 115 of the 3D-link indicator 114 coincident to the selected location of the 3D context 112. While the 3D-link indicator 114 is shown as a pin icon in the example embodiment of FIG. 1A, it should be understood that the 3D-link indicator 114 is not limited thereto and can be any visual indicator or indicia used to indicate that the 3D-link 110 has been created targeting the 3D context 112.

The 3D-link 110 includes a static link 116 (also referred to interchangeably herein as an external link or external 3D-link) and a variable link 118 (also referred to interchangeably herein as an internal link or internal 3D-link). The static link 116 is configured to re-direct to the variable link 118 in response to opening (e.g., user selection and/or activation) of the 3D-link 110. The variable link 118 enables (i) the 3D CAD model 106 to be located and opened and (ii) the 3D context 112 to be displayed within the 3D CAD model 106. The first 3D CAD system 104a is further configured to store the 3D-link 110 in the database 108 that is communicatively coupled to the first 3D CAD system 104a. The 3D-link 110 enables the 3D context 112 to be shared between the first user 102a and second user 102b via sharing of the 3D-link 110 from the database 108.

In the example embodiment of FIG. 1A, the first 3D CAD system 104a and second 3D CAD system 104b include respective display screens, namely, the first display screen 107a and second display screen 107b configured to display the 3D CAD model 106 opened. The 3D context 112 may be a 3D point or geometric entity. To enable the first user 102a to select the 3D context 112, the first 3D CAD system 104a is further configured to enable the first user 102a to drop the 3D-indicator, such as a pin, flag, bookmark icon, or other indicia/visual indicator, onto the 3D point or geometric entity.

The first 3D CAD system 104a is further configured to attach a 3D-link attribute (not shown) onto the 3D point or geometric entity, that is, the 3D context 112, or to reference the 3D point or geometric entity via a 3D-link feature (not shown) for the 3D-link 110. The attribute or 3D-link feature is included in a feature tree of the 3D CAD model 106, such as the 3D-link feature 152 that is included in the feature tree 150 of FIG. 1B, detailed further below.

Continuing with reference to FIG. 1A, the static link 116 may be a text string (not shown), such as described further below, and the first 3D CAD system 104a may be further configured to add the text string of the static link 116 as meta-data to the 3D-link attribute or 3D-link feature, enabling the static link 116 to be used as a key for accessing the variable link 118 in the database 108.

The first 3D CAD system 104a may be further configured to form the variable link 118 by concatenating: a model address including a global or other computer network address (web address or URL for non-limiting example) of the 3D CAD model 106 and (i) a core 3D address (not shown) of the 3D context 112 within the 3D CAD model 106, the core 3D address being a local memory address relative to the model address, or (ii) a unique identifier (not shown) of a 3D-link attribute or 3D-link feature, wherein the core 3D address is included as meta-data within the 3D-link attribute or 3D-link feature. The 3D-link attribute may be attached onto a 3D point or geometric entity, that is, the 3D context 112, of the 3D CAD model 106. The 3D-link feature references (i.e., points) to the 3D context 112.

The first 3D CAD system 104a may be further configured to store the 3D-link 110 in the database 108 by entering the 3D-link 110 into the database 108 as a key-value pair. The key-value pair includes a key (not shown) and a value (not shown), wherein the static link 116 is the key and wherein the variable link 118 is the value.

The 3D CAD model 106 may be stored in a 3D CAD model database (not shown) common in the art. As disclosed above, the database 108 may be referred to as a 3D-link database. According to an example embodiment, the 3D-link database and 3D CAD model database may be hosted by a common cloud environment (not shown). The first 3D CAD system 104a or second 3D CAD system 104b may be configured to access the 3D-link database 108 using a given user authentication of the first user 102a or second user 102b. The given user authentication may be used to open the 3D CAD model 106 that is stored in the 3D CAD model database. Features of the 3D CAD model 106 may be organized in a feature tree, such as the feature tree 150 of FIG. 1B, disclosed below.

Figure 1B:
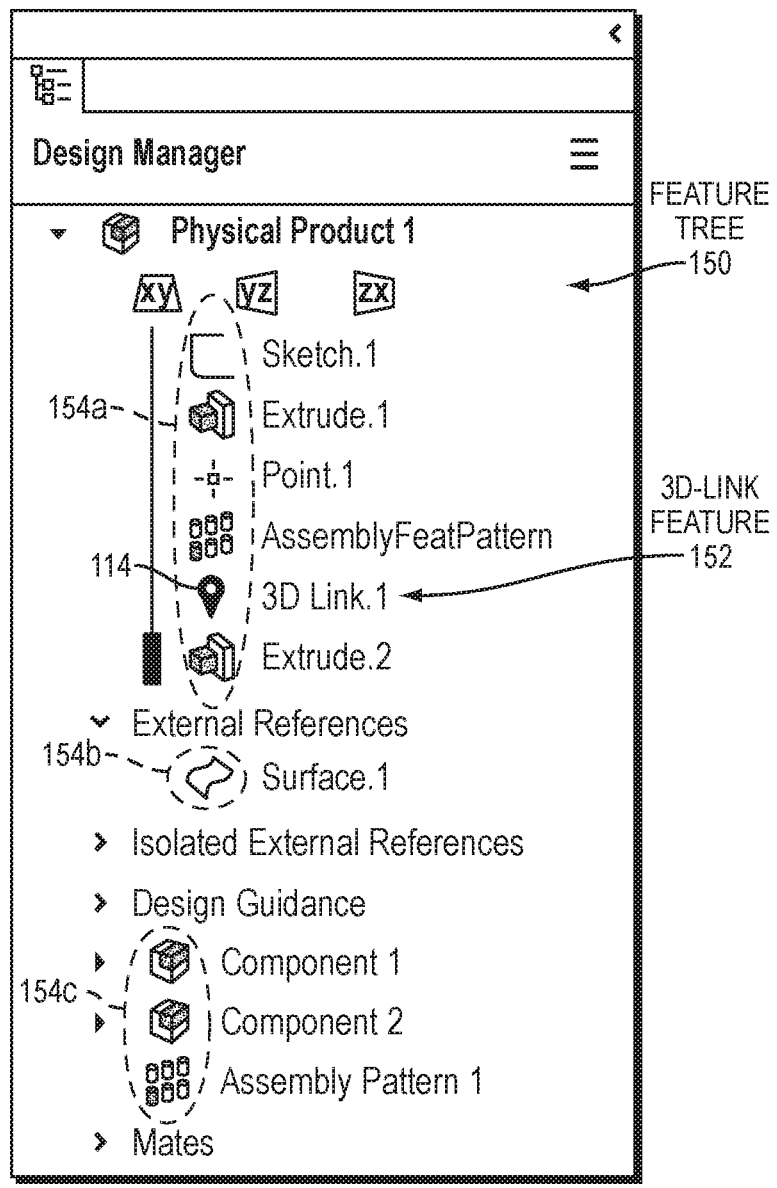
FIG. 1B is a block diagram of an example embodiment of a feature tree.

FIG. 1B is a block diagram of an example embodiment of a feature tree 150. In the feature tree 150, each of the features has a corresponding icon, such as the physical product feature icons 154a, external reference feature icon 154b, and design guidance feature icons 154c. It should be understood that such icons disclosed in FIG. 1B are for illustrative purpose and that a feature icon disclosed herein is not limited thereto.

The feature tree 150 includes a single 3D-link feature 152. In the feature tree 150, the 3D-link feature 152 is displayed at the point in feature history where it was created. The 3D-link feature 152 provides a feature in the feature tree 150 that allows for the edition of the placement and requirements of the 3D-link 110, disclosed above with regard to FIG. 1A. The 3D-link feature 152 provides a rollback point in the history of the 3D CAD model 106 to allow a viewer, such as the first user 104a, second user 104b, or another user, to see when/where/why the 3D-link 110 was created. This is to allow for the tracing of historical changes, manufacturing or assembly instructions, or to make note of a design change of the 3D CAD model 106 at a certain point in the process. In the example embodiment of FIG. 1A, disclosed above, the first user 102a has entered a note 120 regarding the 3D context 112 to indicate to the second user 102b to "Please make sure the surface finish is to spec" for non-limiting example. Such a note may be stored as part of the 3D link feature 152 that is added to the feature tree 150, such as disclosed below with regard to FIG. 1C.

Figure 1C:
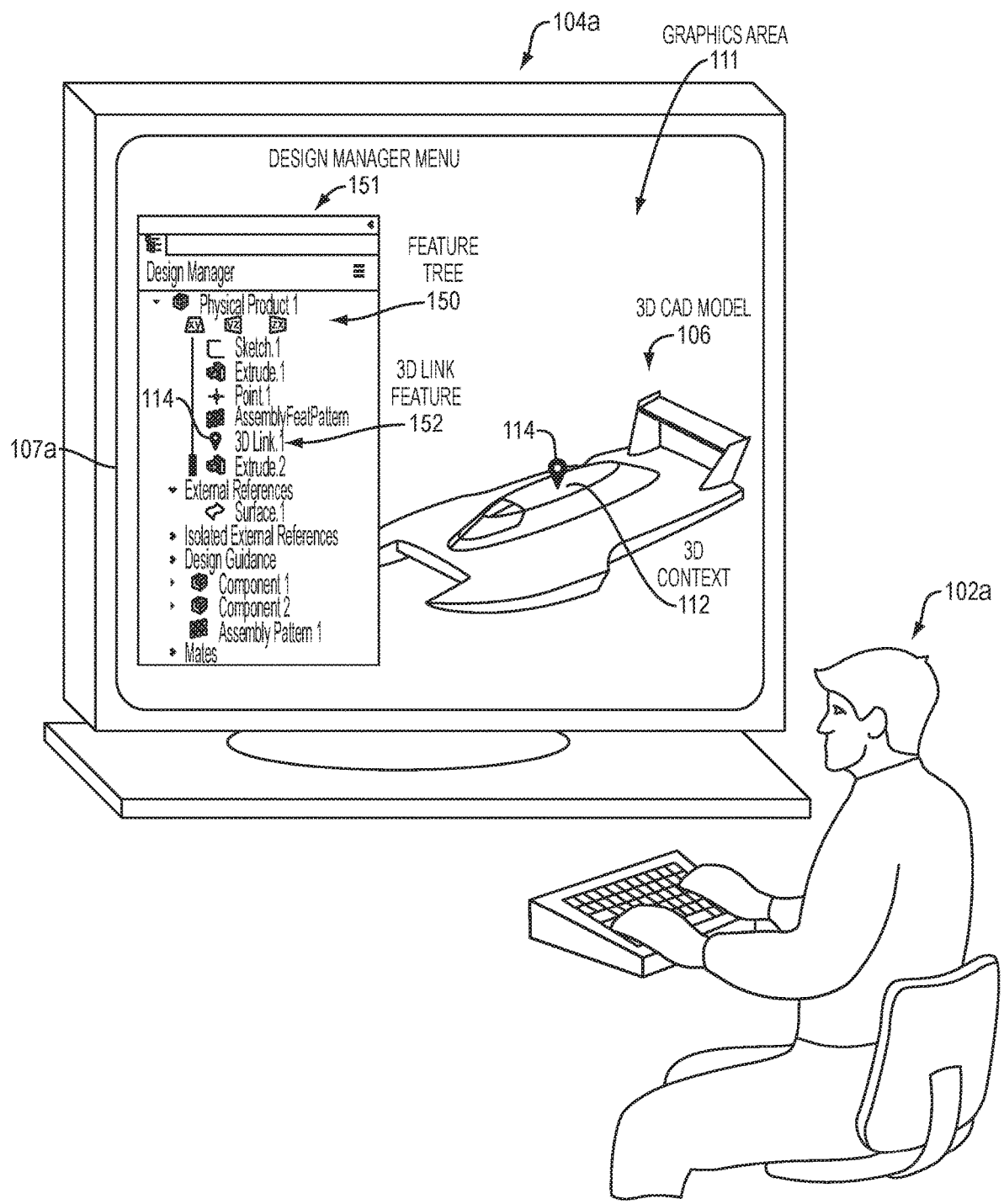
FIG. 1C is a block diagram of an example embodiment of a CAD system of the system of FIG. 1A.

FIG. 1C is a block diagram of an example embodiment of the first 3D CAD system 104a of the system 100 of FIG. 1A. In the example embodiment of FIG. 1C, the first user 102a has created the 3D-link 110 and a representation thereof, that is, the 3D link feature 152, has been added to the feature tree 150 and is accessible to the first user 102a via a design manager menu 151 displayed on the first display screen 107a. The 3D-link feature 152 provides a point for the first user 102a to store additional information for the 3D-link 110, such as the note 120 of FIG. 1A, that is editable and created by the first user 102a. It should be understood that such additional information is not limited to the note 120 and that additional information, such as a designation of a cross-section view that was active at the time of creation of the 3D-link 110, may be stored. The designation may be useful as the 3D-link 110 may be created with the 3D-link indicator 114 on an internal face of the 3D CAD model 106 that is only visible during cross-section display, such as disclosed further below with regard to FIG. 2.

With reference to FIGS. 1A-C, according to an example embodiment, the second 3D CAD system 104b may determine the application (i.e., app) that created the 3D-link 110. By determining the app that created the 3D-link 110, it may be easier for the second user 102b, receiving and following the 3D-link 110, to quickly and easily access the 3D CAD model 106 in the app within which the 3D-link 110 was created. This may be useful for when multiple applications are capable of viewing and/or editing the 3D CAD model 106 in question. By going directly to the creating app, the second user 102b immediately has all of the tools necessary to perform any actions requested through the 3D-link feature 152, such as modifying the 3D context 112 to which the 3D-link 110 is pointing or attached, or by mating the component linked to within the 3D-link 110 at the location where the 3D-link 110 was created.

If the creating app is not available to the second user 102b following the 3D-link 110, the 3D-link 110 may default to a most common application available to the second user 102b, such as the 3DPlay app of Dassault Systèmes®, or another application that may be configured as a default application or selected, for example, via the app-switch dialog 180 of FIG. 1H, disclosed further below. According to an example embodiment, user-preferences may be configurable to enable the second user 102b to configure the second 3D CAD system 104b to open all followed 3D-links in a particular application irrespective of the availability of a respective creating application.

According to an example embodiment, the first 3D CAD system 104a or second 3D CAD system 104b may provide a 3D-link command that may be placed, for example, on a features tab (not shown) of an action bar within a reference geometry flyout (not shown). For example, the 3D-link command may be provided directly below, for example, a Coordinate System command in a SOLIDWORKS® x-app, such as xDesign or xShape, other SOLIDWORKS® x-app, or another app. It should be understood, however, that the 3D-link command is not limited to being placed as described and is not limited to being provided in a SOLIDWORKS® x-app. The 3D-link command may be provided by any application of the first 3D CAD system 104a or second 3D CAD system 104b that enables a user, such as the first user 102a or second user 102b, to create the 3D-link 110.

According to an example embodiment, the first 3D CAD system 104a may provide a 3D-link dialog (not shown) with controls to allow a placement location to be selected for the 3D-link 110 being created by the first user 102a. The placement location may be referred to herein as a pick location and identifies the 3D context 112 targeted by the 3D-link 110. The placement location is a location in the 3D CAD model 106 that is associated with the 3D-link 110. Such user selection of the placement location may be performed via a click point.

According to an example embodiment, the click point may be on a sketch entity (not shown). The placement location may be defined relative to an end-point of an open profile entity, such as line, arc, or spline, and relative to a reference location, such as on a circle or ellipse. According to an example embodiment, infinite length sketch lines may not qualify as valid targets for the 3D-link 110. According to an example embodiment, if a line has a reference 3D-link targeting same and the line is converted to an infinite length line, the target may be deemed invalid and the 3D-link may need to have a new location defined as its target.

According to an example embodiment, the click point may be on a model edge or face of the 3D CAD model 106. The placement location may be defined relative to an end-point of an open profile entity, such as line, arc, or spline, and relative to a reference location on a circle or ellipse. According to an example embodiment, the click point may be on a plane. The placement location may be defined relative to the plane's visible bounding box and may transform with the plane if the plane translates, rotates, or resizes.

According to an example embodiment, the click point may be on an axis. The placement location may be defined relative to the axis' visible extent and may transform with the axis if the axis translates, rotates, or resizes. It should be understood, however, that the click point is not limited to being on a sketch entity, model edge or face, plane, or axis. Selection of the placement location may support a sketch point or vertex, model vertex, reference point or coordinate system, section view face or edge, and the selected placement location may be preserved when the section view is turned off.

According to an example embodiment, selection of the placement location may be limited to entities in the same component of a 3D model. For example, according to an example embodiment, 3D-links, such as the 3D-link 110, may be limited to a given geometry that is in the same "3DShape" as other 3D-link(s) already created. A 3D-link dialog with controls may enable creation of a plain text note, such as the note 120, that is associated with the 3D-link 110.

As disclosed above, the first 3D CAD system 104 may be configured to provide the 3D-link indicator 114 that may be attached to the pick location in the graphics area 111. The 3D-link indicator 114 may be vertical but is not limited thereto. A tip 115 of the 3D-link indicator 114 may be coincident to the user selected location, that is, the targeted 3D context 112, but is not limited thereto. An orientation of the 3D-link indicator 114 may be defined relative to the active/current coordinate system and may be maintained relative to the active/current coordinate system as the 3D CAD model 106 is rotated. According to an example embodiment, the 3D-link indicator 114 may be visible and selectable through other geometry using known techniques. The 3D-link indicator 114 may be zoom invariant, similar to a reference point and coordinate system using known or common techniques.

According to an example embodiment, the first 3D CAD system 104a or second 3D CAD system 104b may be configured to create a new 3D-link feature, such as the 3D-link feature 152, at a point in the feature history in the feature tree 150. According to an example embodiment, the 3D-link 110 may be parametric, that is, if the location to which it is attached moves to a new location, the 3D-link 110 moves with it, that is, the 3D-link 110 may be adjusted to reference the new location based on an adjustment of information stored in the 3D-link feature 152. According to an example embodiment, the 3D-link feature 152 may store with it the following: a placement location, as disclosed above, plain text note, as disclosed above, view orientation and zoom factor at the time of creating the 3D-link 110, or combination thereof. Further, the section view settings may also be stored therewith if the 3D-link 110 was attached to a sectioned face or edge. According to an example embodiment, the first 3D CAD system 104a or second 3D CAD system 104b may be configured to provide context menus, such as disclosed below with regard to FIGS. 1D and 1E, for use by the user.

Figure 1D:
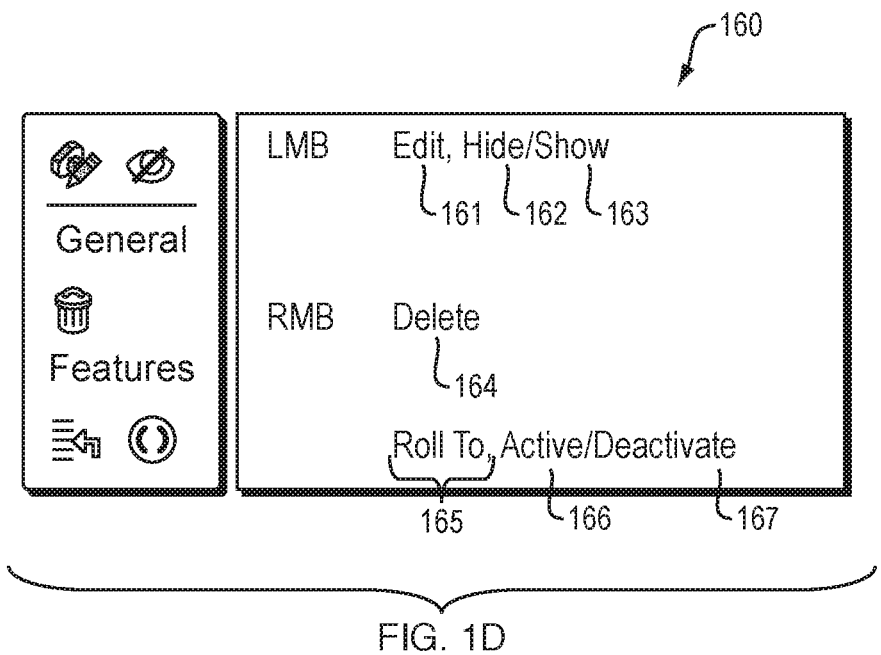
FIG. 1D is a display of an example embodiment of a feature tree context menu.

FIG. 1D is a display of an example embodiment of a feature tree context menu 160. The feature context menu 160 enables selection of the 3D-link feature 152 in the feature tree 150 of FIG. 1C, disclosed above, with the ability to Edit 161, Hide 162 or Show 163, Delete 164, Roll To 165, and Active 166 or Deactivate 167, the 3D-link 110 disclosed above.

Figure 1E:
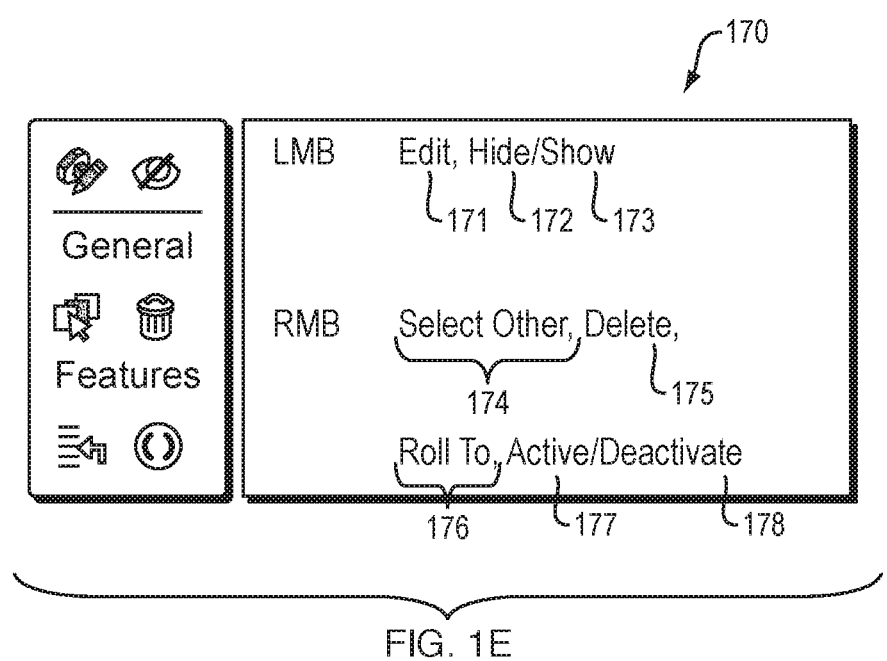
FIG. 1E is a display of an example embodiment of a graphics area context menu.

FIG. 1E is a display of an example embodiment of a graphics area context menu 170. The graphics area context menu 170 enables selection, in the graphics area 111, of the 3D-link 110, for example, via selection of the 3D-link indicator 114 representing same, with the ability to Edit 171, Hide 172 or Show 173, Select Other 174, Delete 175, Roll To 176, and Active 177 or Deactivate 178, the 3D-link 110.

Referring back to FIG. 1C, according to an example embodiment, the first 3D CAD system 104a may be configured to provide dynamic and selection cross-highlighting within the feature tree 150 and/or graphics area 111. The first 3D CAD system 104a may be configured to allow for renaming of the 3D-link feature 152 in the feature tree 150. It should be understood that the name "3D Link.1" is for illustrative purpose and that the name of the 3D-link feature 152 in the feature tree 150 is not limited thereto. Such renaming may, however, be implemented such that it does not break the ability for the 3D-link feature 152 to find the 3D-link 110 it was created from, unless, for example, the 3D CAD model 106 or 3D-link feature 152 were to be deleted.

According to an example embodiment, the first 3D CAD system 104a may be configured to allow for the 3D-link 110 to be shared on the same tenant that the 3D CAD model 106 resides, including, for example, "See what You mean" (SwYm) posts, instant message, and hyperlinks in miscellaneous other widgets, etc. The first 3D CAD system 104a may be configured to allow 3D-links to be created between model components at different levels of an assembly. For example, the first 3D CAD system 104a may allow the 3D-link 110 to be created in the 3DShape of one model component that is attached to a location in the 3DShape of another component.

According to an example embodiment, the first 3D CAD system 104a may be configured to enable the respective first user 102a to include information with the 3D-link feature 152, such as an image(s), video(s), link to another model component(s), or a combination thereof.

According to an example embodiment the first 3D CAD system 104a may be configured to associate a thumbnail (not shown) with the 3D-link 110 and the 3D-link feature 152 may store a reference to the thumbnail. If the first user 102a has not created their own thumbnail, the first 3D CAD system 104a may create one based on an "OK" input received from the first user 102a in response to a query regarding same. The first 3D CAD system 104a may be configured to display a dialog (not shown) that queries the first user 102a for whether to create the thumbnail. If so, the 3D-link 110 may be associated with the user-created thumbnail and the 3D-link feature 152 may reference same.

Referring to FIGS. 1A-C, according to an example embodiment, the first 3D CAD system 104a or second 3D CAD system 104b may display the thumbnail in a mouse-hover tooltip (not shown) in the feature tree 150 and/or may display the thumbnail when the 3D-link 110 is posted, for example, in a SwYm message, instant message, or another type of electronic message. According to an example embodiment, the 3D-link feature 152 may store with it a section view state (not shown) that is present at the time of creation of the 3D-link 110 and/or reference to the thumbnail image, disclosed above.

According to an example embodiment, the 3D-link 110 may be expressed in the form of a text string. A 3D-link, such as the 3D-link 110, targets the 3D context 112 that includes a 3D location, such as a point or geometric entity of the subject CAD model and its environment. For example, the target of the 3D-link may be a fixed 3D point specified by the x, y, z coordinates expressed in a coordinate system of the 3D CAD model 106. Alternatively, a target of the 3D-link 110 may be any of the following geometric entities contained within the 3D CAD model 106: a feature; geometry in the 3D CAD model 106, such as a face, edge or vertex, belonging to a feature; reference plane; reference line; reference point; sketch; dimension element on a sketch or 3D solid; annotation element on a sketch or 3D solid; or a combination thereof.

The variable link 118 may contain the entire address (not shown) needed to be able to locate the 3D CAD model 106 in a model database (not shown) and locate the target geometric entity, that is, the 3D context 112, within the 3D CAD model 106. For non-limiting example, the entire address comprises a web address (e.g., URL), a network computer memory address, a server or other computer memory address, local memory address, and/or the like. The static link 118 may be shorter in length link relative to the variable link 118, and may act as an alias to the variable link 118 which redirects to the variable link 118.

Any modification that a user, such as the first user 102*a* or second user 102*b*, may make to the 3D CAD model 106 may cause the variable link 118 to become invalid because the modification to the 3D CAD model 106 may cause the target geometric entity to change, such as disclosed further below with regard to FIGS. 5C-H. In that case, the variable link 118 would need to be modified. According to an example embodiment, the static link 116 is permanent and remains unchanged.

According to an example embodiment, the static link 116 and corresponding variable link 118 are stored in the database 108 that may be referred to as a 3D-link database, as disclosed above, and may be stored in the form of key-value pairs, wherein the static 3D-link is the key and the variable 3D-link is the value. If the variable link 118 needs to be updated due to a modification made to the 3D CAD model 106, then a text value of the corresponding variable link 118 entry may be updated in the 3D-link database, that is, the database 108. The static link 116 in that entry may, however, remain unchanged.

According to an example embodiment, the 3D-link database, that is, the database 108, may be co-located with the 3D model database that stores the 3D CAD model 106. As such, if the 3D model database is hosted on a certain cloud environment, then the 3D-link database would be hosted on that same cloud environment. This allows the first 3D CAD system 104*a* or second 3D CAD system 104*b* to access the 3D-link database with the same user authentication that was used to open the 3D CAD model 106 from the 3D model database.

The 3D-link database 108 may serve as a single dedicated storage of the up-to-date text strings of all variable 3D-links created on 3D CAD models belonging to a certain 3D CAD model database. It may also serve as a directory such that given a static link, such as the static link 116, the 3D-link database allows for searching of the most up-to-date corresponding variable link, such as the variable link 118. The static link 116 may serve as the key used in searching for the variable link 118. The searching can be made faster by using standard database indexing techniques.

According to an example embodiment, the variable link 118 may include three components (working portions) that can be concatenated together to form the variable link 118, such as a model address, core 3D address, and, optionally, view parameters. It should be understood, however, that the variable link 118 is not limited to concatenation thereof. The model address may comprise the address (global computer network address, server or other computer memory address, etc.) of the 3D CAD model 106 in the 3D CAD model database. It may include the version/revision information of the 3D CAD model 106. The model address may also include additional details, such as the name of (or a text string that can be used as an identifier of) the CAD web app in which the 3D CAD model 106 is to be opened when a user, such as the first user 102*a* or second user 102*b*, opens the 3D-link 110.

The core 3D address may comprise the local memory address of the target location, that is, the 3D context 112, within the 3D CAD model 106. The core 3D address may be relative because it may inherit address context from the model address. The target, that is, the context 112, may be a fixed 3D point or a geometric entity. If the target is a fixed 3D point, the core 3D address may be referred to herein as a "core 3D point address." If the target is a geometric entity, then the core 3D address may be referred to herein as a "core 3D entity address."

The view parameters (not shown) may comprise the necessary parameters needed to define the pose (not shown) of the camera (not shown) and view conditions (not shown). The pose of the camera determines how the target would be displayed on a screen, such as the first display screen 107*a* or second display screen 107*b*, when the 3D CAD model 106 is opened in a CAD program using the 3D-link 110.

According to an example embodiment, a 3D CAD system, such as the first 3D CAD system 104*a* or second 3D CAD system 104*b*, may allow a user to specify that the 3D-link 110 is locked to a specific version/revision of the 3D CAD model 106, in which case the model address may additionally include the information of the version/revision of the 3D CAD model 106. By locking the 3D-link 110 to a specific CAD model version, the 3D-link 110 can be made immune to modifications made to the 3D CAD model 106 in future revisions and versions. As long as the version/revision in question remains available in the CAD system, the 3D-link 110 will remain valid.

According to an example embodiment, the model address may be implemented as a URL of the 3D CAD model 106 stored on a cloud, along with the name of the default web app in which to open the 3D CAD model 106. For non-limiting example, "http://3dexperience.3ds.com/model_id: 1234/webapp_name:xdesign." According to another example embodiment, that model address may be implemented as a URL of the 3D CAD model 106 stored in a database, such as the database 108 or other database, accessible from a web server (not shown). For non-limiting example, "http://12.23.34.45/model_id:1234." Most modern CAD databases on a server or cloud already provide support to have addresses, such as URLs, for 3D models contained in a database. According to another example embodiment, the model address may include a query to retrieve the 3D CAD model 106, such as a structured query language (SQL) query or REST GET request application programming interface (API) query.

Alternate implementations for the model address may be employed for sharing within local networks, when the model address may comprise a universal naming convention (UNC) path or portable operating system interface (POSIX) path of the 3D CAD model 106 that may be stored on a computer within a user's network.

According to an example embodiment, while sharing the 3D CAD model 106 in the form of a file attached to emails or FTP, the model address may be skipped, entirely. In that case, the 3D CAD system may form the 3D-link 110 by concatenating the two remaining components/portions of 3D-link 110, namely the "core 3D address" and "view parameters." The model address is not needed in this case because the CAD model itself is being sent to the user in some form.

According to an example embodiment, the "core 3D point address" may be implemented as x, y, z coordinates of the fixed 3D point expressed in the coordinate system of the 3D model. The text string of the "core 3D point address" may look something like "/x:10.5/y:20.0/z:0.0." It should be understood, however, that the core 3D point address is not limited thereto.

According to an example embodiment, in an implementation for the "core 3D entity address," the 3D CAD system may choose to attach an attribute, referred to herein as a 3D-link attribute, to the targeted geometric entity, that is, the 3D context 112. The "core 3D entity address" may, in that case, comprise a unique identifier of the 3D-link attribute. The meta-data in the 3D-link attribute may, in a non-limiting example embodiment, hold the static link 116. Most modern CAD systems allow a mechanism to quickly access the geometric entity from any attribute attached to it. The text string of the "core 3D entity address" in this case may look something like "/3DURL_attrib_id:9876." It should be understood, however, that the text string is not limited thereto.

In another possible implementation, the 3D CAD system 104a, b may choose to create a new 3D-link feature 152 in the feature tree 150 that points to the geometric entity, that is, the 3D context 112. The 3D-link feature 152 may be kept hidden, so that a user, such as the first user 102a or second user 102b, may not see it in the first display screen 107a or second display screen 107b, respectively. Alternatively, the 3D-link feature 152 may be visible to the user. For example, a CAD program may also choose to display the 3D-link feature 152 in the feature tree 150. The meta-data of the 3D-link feature 152 can hold the static link 116. The "core 3D entity address" may, in that case, comprise the unique identifier of the 3D-link feature 152 and its text string may look something like "/feature_id:9876." It should be understood, however, that its text string is not limited thereto.

In another possible implementation, the "core 3D entity address" may be defined as an entity-path. According to an example embodiment, an entity-path comprises an ordered list of the unique identifiers of feature nodes that need to be traversed starting from a root of the feature tree 150 to the node representing of the desired geometric entity, that is, feature node corresponding to the 3D-link feature 152. This ordered list may also include the unique identifier of the targeted geometric entity, that is, the 3D context 112. The text string of the 'core 3D entity address' in this case may look something like "/subassembly_id:123/instance_id:234/fillet_id:345." It should be understood, however, that its text string is not limited thereto.

According to an example embodiment, an implementation for "view parameters" may include camera pose parameters, parameters specifying view conditions, or a combination thereof. Such camera pose parameters may include a coordinate axis system of the virtual camera, camera type, principal point of the image plane (needed for a perspective view), or a combination thereof, at a time of creation of the 3D link 110.

The coordinate axis system may include an origin that indicates the eye position or the optical center of the camera, x-axis direction that indicates the horizontal direction, y-direction that indicates the vertical direction, z-axis direction that indicates the view direction or the optical axis direction, or a combination thereof. The camera type may be "parallel" or "perspective." Common technology and techniques known in the art are employed to implement such aspects of the coordinate system and virtual camera.

Parameters specifying view conditions may include a shading type, such as "wireframe" mode, "shaded silhouette/outline" mode, "shaded without silhouette/outline" mode, etc., ambient parameter(s), such as background color, shadows on/off, etc., transparency/opacity level, or a combination thereof.

It should be understood, however, that the view parameters are not limited to the camera pose parameters and/or parameters specifying view conditions disclosed above. The text string of the 'view parameters' may look something like: "/ox:1.0/oy:2.0/oz:0.0/axx:1.0/axy:0.0/axz:0.0/ayx:0.0/ayy:1.0/ayz:0.0/cam:parallel/shading:wire frame/." It should be understood, however, that the text string of the view parameters is not limited thereto.

A text string of the variable link 118 may look something like: http://3dexperience.3ds.com/model_id:1234/webapp_name:xdesign/3DURL_attrib_id:9876/ox:1.0/oy:2.0/oz:0.0/axx:1.0/axy:0.0/axz:0.0/ayx:0.0/ayy:1.0/ayz:0.0/cam:parallel/shading:wireframe/". It should be understood, however, that a text string of the variable link 118 is not limited thereto.

While the example above shows the 3D-link 110 expressed as a Hypertext Transfer protocol (HTTP) address, it should be understood that the 3D-link 110 is not limited to being expressed as an HTTP address. For example, the 3D-link 110 can be composed in any form, such as JavaScript Object Notation (JSON), eXtensible Markup Language (XML), or any other format the CAD system can parse to extract individual addressing components therefrom.

According to an example embodiment, the static link 116 may include two components/working portions. It should be understood, however, that the static link 116 is not limited to including two components/portions. According to an example embodiment, the static link 116 may include an address to the 3D-link database, that is, the database 108, that contains a mapping from the static link 116 to the variable link 118, as well as a unique persistent key/identifier to the corresponding entry (in the 3D-link database) that contains the text string of the variable link 118.

The first 3D CAD system 104a creating the 3D-link 110 may be configured to ensure that the static link 116 is unique. One way to ensure such uniqueness is to use a universally unique identifier (UUID) generated using any well-known standard method. It should be understood, however, that the first 3D CAD system 104a is not limited to employing a UUID generator (not shown) to ensure that that static link 116 is unique. The text string of the static link 116 may look something like: "http://short3dur1.3ds.com/3durl_uuid:123e4567-e89b-12d3-a456-426655440000/." It should be understood, however, that the text string is not limited thereto.

According to an example embodiment, creating the 3D-link 110 for a given target, that is, the 3D context 112, may begin with the first 3D CAD system 104a enabling the first user 102a to choose a target geometry. This may be done by enabling the first user 102a to select a geometric entity in the currently open 3D CAD model 106 and dropping the 3D-link indicator 114, that may be a pin, flag, bookmark icon, or other indicator/indicia, onto the geometric entity selected. The first 3D CAD system 104a may attach a 3D-link attribute onto the selected geometric entity or create a new 3D-link feature, such as the 3D-link feature 152, that points to the geometric entity selected.

The first 3D CAD system 104a creating the 3D link 110 may be configured to compute components/portions of the variable link 118 for the geometric entity. For example, the first 3D CAD system 104a may be configured to compute a component/portion, such the model address, core 3D address, view parameters of the current view, disclosed above, or a combination thereof. The first 3D CAD system 104a may be configured to concatenate such components/portions computed in order to form the variable link 118. The first 3D CAD system 104a may be configured to create the static link 116 for the variable link 118 and enter a key-value pair into the 3D-link database, that is, the database 108, wherein the key is the static link 116 and the value is the variable link 118. A text string of the static link 116 may be added as meta-data to the 3D-link attribute or 3D-link feature 152.

The first 3D CAD system 104a may add the static link 115 to the 3D-link attribute or 3D-link feature 152 so that, using the static link 116 as a key, the corresponding variable link 118 can be accessed from the 3D-link database, that is, the database 108, at any time as needed. Such a need may arise when a modification to the 3D CAD model 106 makes it necessary to modify the variable link 118, such as disclosed further below. Adding the static link 116 as meta-data to the 3D-link attribute or 3D-link feature 152 allows the first 3D CAD system 104a to keep the variable link 118 in the database 108 in sync with the modification to the 3D CAD model 106, as disclosed further below.

As a variation of the implementation, additional information could be stored with the 3D-link attribute or 3D-link feature 152. This information could be anything that the user may want to attach to the 3D context 112 of the 3D-link 112. For example, it could be a text, such as the note 120, a URL to a web-site that relates to the 3D context 112 in some way, or it could be a picture (image file) of something that was used as a reference to model a feature of the 3D context 112, audio file, etc.

According to an example embodiment, right-clicking (or other user interactive command) on the 3D-link indicator 114 (e.g., pin/flag/other) can open a menu (not shown) that offers commands, such as "Edit," "Delete," "Copy," etc., that can be performed on the 3D-link 110. For example, by clicking on (user interactively selecting) the Edit command, the first user 102a or second user 102b may edit the additional information, such as the user-specified note/text/ other, that is associated with the 3D-link. Clicking on (user interactively selecting) the Delete command may delete the 3D-link and remove the corresponding 3D-link indicator 114 from display. Clicking on (user interactively selecting) the Copy command may copy a text string that expresses the 3D-link 110 to a clipboard, so that the text string representation can be pasted elsewhere, for example, in a blog post, email, or other.

As disclosed above, a thumbnail image of a 3D location of the 3D CAD model 106 may be stored with the 3D-link attribute or 3D-link feature 152. A new link may be generated for the thumbnail image and such link can also be stored with the 3D-link attribute or 3D-link feature 152. When the 3D-link 110 is embedded into some content, such as a web-page, email, or other medium, then the thumbnail image can be displayed along with the 3D-link 110.

Pins/flags/bookmark icons or other visual indicators/indicia may be used to help a user, such as the first user 102a or second user 102b, easily identify all the geometric entities in the currently open 3D CAD model 106 for which 3D-links, such as the 3D-link 110, have been created. Such 3D-link indicators may allow for user interaction. For example, the user may use a mouse or other pointing device to hover on a particular 3D-link indicator, such as the 3D-link indicator 114 that may be a pin/flag/bookmark icon or other visual indicator/indicia, and an app may display the additional information, such as a user-specified note/text, such as the note 120, or other information, that is associated with the 3D-link 110 corresponding to the 3D-link indicator 114, such as disclosed below with regard to FIG. 1F.

Figure 1F:
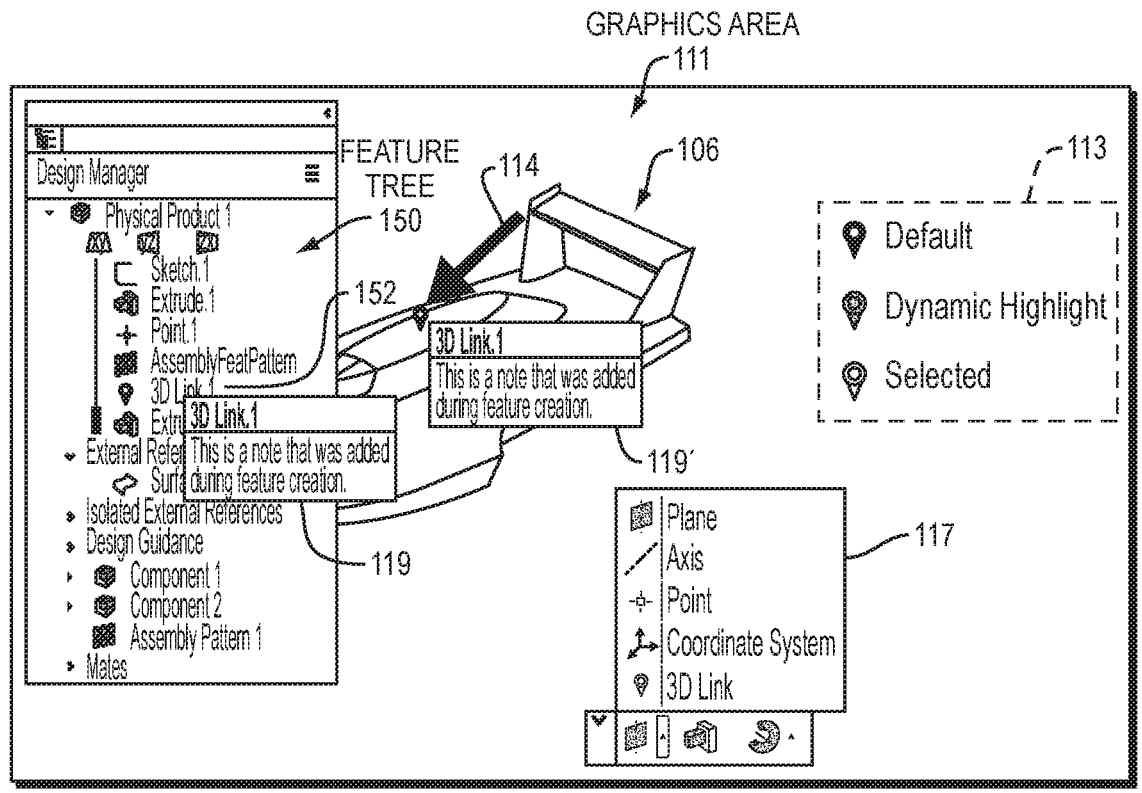
FIG. 1F is a schematic view of an example embodiment display of a 3D-link indicator and mouse-hover tooltips.

FIG. 1F is a schematic view of an example embodiment display of a 3D-link indicator 114 and mouse-hover tooltips In the example embodiment of FIG. 1F, a first mouse-hover tooltip 119 is shown in the feature tree 150 and a second mouse-hover tooltip 119' is shown in the graphics area 111. According to an example embodiment, only one tooltip will be shown at a time depending on where the cursor or pointer as controlled by a cursor-control device, e.g., mouse (not shown), is hovering. For example, the first mouse-hover tooltip 119 may be displayed in response to a cursor hovering over the 3D-link indicator 114 in the graphics area 111 and the second mouse-hover tooltip 119' may be displayed in response to the cursor hovering over the 3D-link indicator 114 by the 3D-link feature 152 in the feature tree 150. Selection in the graphics area 111 may highlight the 3D-link indicator 114 in the feature tree 152 and vice versa. An example embodiment of highlighting 113 for different states of the 3D-link indicator 114 is shown. It should be understood, however, that different states of the 3D-link indicator 114 is not limited thereto or to the highlighting 113 thereof. In the example embodiment of FIG. 1F, a legend 117 is included that clarifies various icons used for representing a plane, axis, point, coordinate system, and 3D-link (such as 3D-link 110 of FIG. 1A) in the display or current screen view.

Figure 1G:
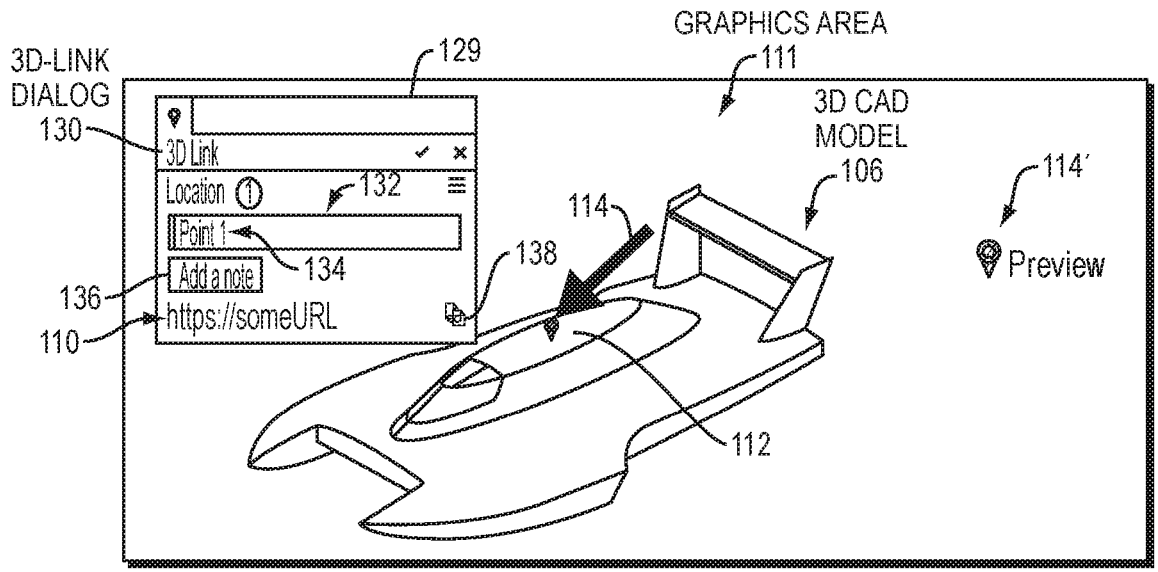
FIG. 1G is a schematic view of another example embodiment display of the 3D-link indicator and a mouse-hover tooltip.

FIG. 1G is a schematic view of another example embodiment display of the 3D-link indicator 114 and a mouse-hover tooltip 129. As disclosed above, a user may click a 3D-link command (not shown) on an action bar (not shown). The user may have pre-selected a reference, that is, the 3D context 112, on which to create the 3D-link 110, disclosed above. In response to same, the 3D CAD system 104a, b may be configured to display a 3D-link dialog 130. A location selection list 132 may be populated with a pre-selection 134 if made by the user. If the user has pre-selected multiple items, only a first pre-selected item may be populated according to an example embodiment but is not limited thereto. The user may select the desired location for the 3D-link 110 to be created on the 3D CAD model 106 if the user didn't pre-select one.

Once a location has been selected, a preview 114' of the 3D-link indicator 114 may be displayed at the selected location, that is, proximate to the 3D context 112 in the example embodiment. The user can choose to add a plain text note, such as the note 120 disclosed above, to the 3D-link 110 by clicking on (interactively selecting) the Add Note button 136. Once clicked, the Add Note button 136 may display a re-sizeable plain text field enabling the user to type their desired text in the plain text field. Pressing Enter while in the text field may input a carriage return and not exit from entry.

According to an example embodiment, the user can choose to copy the 3D-link 110, that is expressed as a URL in the example embodiment, by pressing the Copy URL button 138. The user can hit OK (not shown) to create: (i) the 3D-link 110, (ii) the corresponding 3D-link indicator 114 in the graphics area 111, and (iii) the associated 3D-link feature 152 in the feature tree 150 as disclosed above with regard to FIGS. 1A-1C. The 3D-link feature 152 may store the information entered by the user via the Add Note button 136. The user can edit the 3D-link feature 152 and change the location or text note, the 3D-link 110 may, however, remain the same even its corresponding 3D-link feature 152 is modified, as the 3D-link 110 identifies the 3D-link feature 152 and 3D CAD model 106.

The copied 3D-link 110 that may be a URL can then be pasted in places like an email, SWYM post, instant message, etc., as disclosed above. Assuming the recipient of the 3D-link 110, such as the second user 102*b* of FIG. 1A, disclosed above, has proper access to the tenant and collaborative space in which the linked model, that is, the 3D CAD model 106, exists, the recipient should be brought to the platform and the 3D CAD model 106 opened in an app, such as xDesign or another app, for the user. Such an opening process may include logging in of the recipient to a CAD platform, their rights checked, locating the 3D CAD model 106 in a model database, and opening the 3D CAD model 106 in a CAD application. According to an example embodiment, the application may be xDesign, xShape, xGenerative Design, or another app, such as disclosed above, and in an event the recipient doesn't have access to such apps, the 3D CAD model 106 may be opened in 3DPlay. In order to open the 3D CAD model 106 in an app selected by the user, a dialog similar to an app-switch dialog may be displayed to allow the recipient to choose the desired app. An example embodiment of such a dialog is shown in FIG. 1H.

Figure 1H:
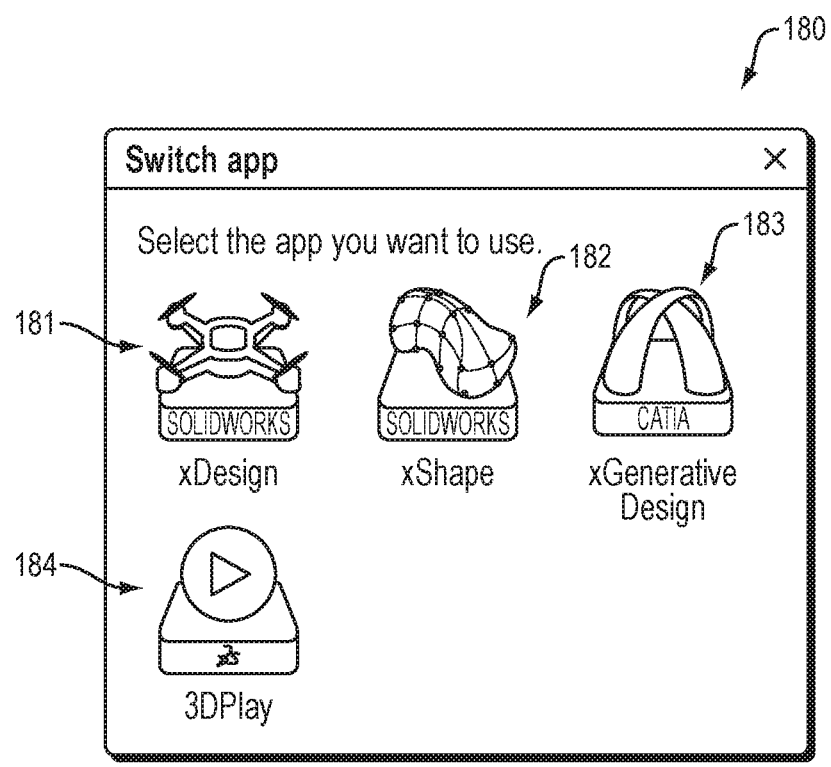
FIG. 1H is a display of an example embodiment of an app-switch dialog.

FIG. 1H is a display of an example embodiment of an app-switch dialog 180 that allows a user, such as the first user 102*a* or second user 102*b* to open the 3D CAD model 106, disclosed above with reference to FIG. 1A, in an xDesign 181, xShape 182, xGenerative Design 183, or 3DPlay application 184. Once the app is user-selected in the dialog 180, the 3D CAD model is displayed within the corresponding selected CAD application which, in turn, navigates to the target of the subject 3D-link 110. According to an example embodiment, the target may be an internal face of the 3D CAD model, such as disclosed below with regard to FIG. 2.

Figure 2:
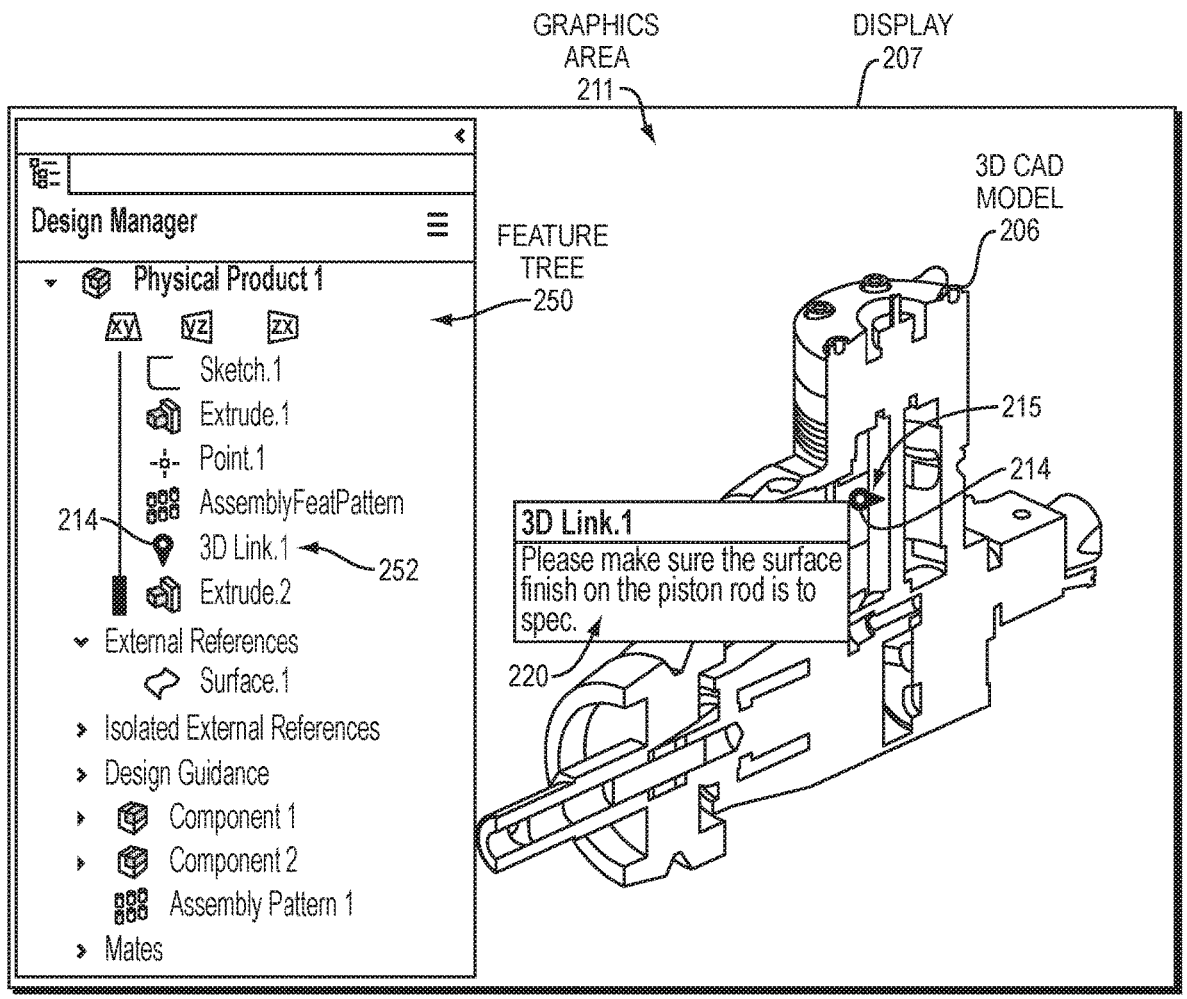
FIG. 2 is a schematic view of a display screen illustrating visualization of an example embodiment of a 3D-link indicator.

FIG. 2 is a schematic view of a display screen 207 illustrating visualization of an example embodiment of a 3D-link indicator 214. In the non-limiting example embodiment of FIG. 2, the 3D-link indicator 214 is on internal face 215 of a 3D CAD model 206 that is only visible during cross-section display. The screen view or display 207 shows the 3D-link indicator 214 created normal to the internal face 215 to which it is attached and recalling of the section view that was active at the time of its creation.

A same icon for the 3D-link feature 252 in the feature tree 250 may be used for the 3D-link indicator 214 that is a visual representation of the 3D-link feature 252 in the graphics area 211, as well as its corresponding 3D-link. As such, an example embodiment of CAD system, such as the first 3D CAD system 104*a* or second 3D CAD system 104*b*, may be configured to support multiple visualizations of the 3D-link indicator 214 to indicate different status for the same.

For example, there may a visualization to indicate a creation/edition mode, a dynamic highlight may be used for cross-reference purposes between the feature tree 250 and the graphics area 211. Selection highlighting may be employed to convey a process being performed on the 3D-link indicator 214, such as edit, delete, or other process. According to an example embodiment, an error/warning indication for the 3D-link indicator 214 may be employed for purposes of easily identifying that the 3D-link feature 252 and it corresponding 3D-link has lost a respective reference, that is, its targeted 3D context, such as the internal face 215.

According to an example embodiment, the 3D-link indicator 214 may have different orientations relative to the subject 3D CAD model 206. For example, by pointing normal to a point on a line/edge, face, plane, etc., the 3D-link indicator 214 can "point" to the location, that is, the 3D context, to help convey the importance of the orientation of the information included in a plain text note 220 or how/where to mate another model component (not shown) that it is linked in the 3D-link. By keeping the 3D-link indicator 214 oriented "vertically" on the display screen 207 at all times, it may allow for easier recognition of the 3D-link indicators irrespective of the orientation of the 3D CAD model 206. As disclosed above, multiple visualizations of the 3D-link indicator 214 may be used to indicate different status, modes, or state for same, such as disclosed in the table 300 of FIG. 3, disclosed below.

Figure 3:
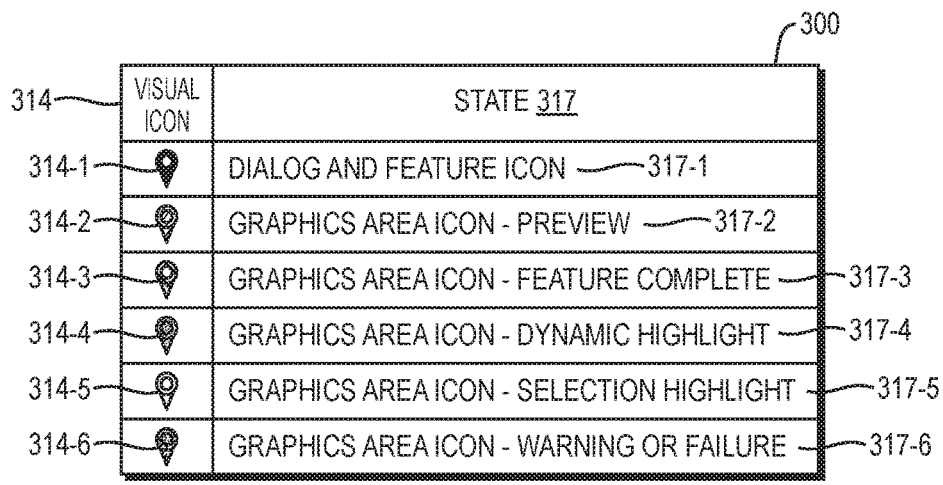
FIG. 3 is a table of an example embodiment of a visual icon corresponding to a state of a 3D-link indicator.

FIG. 3 is a table 300 of a non-limiting example embodiment of a visual icon 314 corresponding to a state 317 of a 3D-link indicator. The various states, namely, 317-1, 317-2, 317-3, 317-4, 317-5, and 317-6 may be represented with the various visual icons, namely, 314-1, 314-2, 314-3, 314-4, 314-5, and 314-6, respectively, for the 3D-link indicator and may be shown in the graphics area, such as the graphics area 211 and feature tree 250, disclosed above with regard to FIG. 2. It should be understood, however, that the state 317 and corresponding visual icon 314 of the table 300 are for illustrative purposes and that a 3D-link indicator (such as 114, 214 of FIGS. 1A-1C and 2) and state thereof disclosed herein are not limited to same.

As disclosed above, a 3D-link indicator may be used to represent both the 3D-link and its corresponding 3D-link feature in a feature tree. The 3D-link feature may include additional information associated with the 3D-link. Such additional information may be displayed to end-users, such as disclosed below with regard to FIG. 4.

Figure 4:
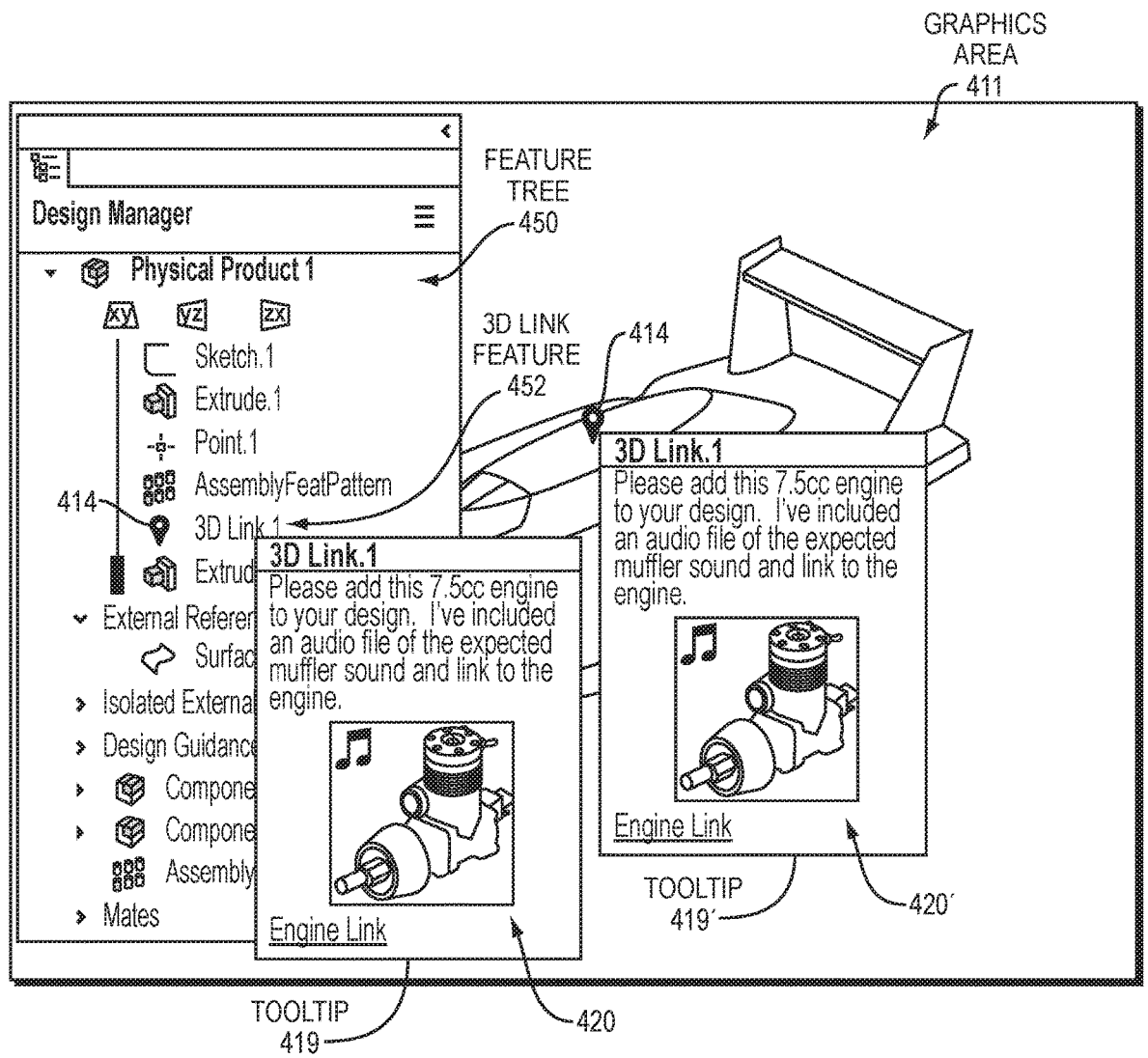
FIG. 4 is a schematic view of an example embodiment display of information within a 3D-link feature that is displayed in a feature tree or graphics area via a mouse-over tooltip.

FIG. 4 is a schematic view of an example embodiment display of information 420 and 420' within a 3D-link feature 452 that is being displayed in the feature tree 450 or graphics area 411 via a mouse-over tooltip 419 or 419'. By allowing for the inclusion of such things as images, videos, audio tracks, documents, and links to other models, the 3D-link feature can be used as a tool to help the user by keeping the relevant information contained within the 3D-link feature 452, thus, making it easy for the user to find and update if needed. By keeping the information contained inside of the 3D-link feature 452, the information is capable of "travelling" with the CAD model in cases where the CAD model is shared via export from one tenant and imported into another.

As disclosed in the example embodiment, the tooltip 419 or 419' can be displayed in either the feature tree 450 or graphics area 411 dependent upon the location of the cursor (not shown), such as a mouse cursor, pointer, or other indicator for current position of user interaction on a display device. The information 420 and 420' relates to the targeted point or geometric entity that is targeted by the 3D-link indicator, such as the 3D context 112 that is targeted by the 3D-link 110 of FIG. 1A, disclosed above.

Referring back to FIG. 1A, the 3D CAD model 106 may be modified after the 3D link 110 has been created. If the target location, that is, such as the 3D context 112, is a fixed point in the 3D CAD model 106 then, according to an example embodiment, the target location/3D context remains unchanged even if the 3D CAD model 106 undergoes a modification, as disclosed below with regard to FIGS. 5A and 5B. Alternatively, if the target location of the 3D-link 110 is a geometric entity in the 3D CAD model 106, then the target location/3D context may change in accordance with the modification made to the 3D CAD model 106, such as disclosed below with regard to FIGS. 5C-H.

FIG. 5A is a CAD diagram of an example embodiment of a cylinder 507 with a point 512 that is a target of a 3D-link (not shown). A location of the point 512 is fixed in the coordinate system of the CAD diagram. The location of the point 512 isn't affected when a height 513 of the cylinder 507 is reduced, as disclosed below with regard to FIG. 5B.

FIG. 5B is a CAD diagram of an example embodiment of the cylinder 507 of FIG. 5A. In the example embodiment of FIG. 5B, the height 513 of the cylinder 507 in FIG. 5A has been reduced to the height 513'. The location of the point 512, has not, however, been affected relative to its location in FIG. 5A.

FIG. 5C is a CAD diagram of another example embodiment of the cylinder 507 of FIG. 5A. In the example embodiment of FIG. 5C, a geometric entity 515, that is, a highlighted face of the cylinder 507, is the target of the 3D-link and the cylinder 507 has a height 513.

FIG. 5D is a CAD diagram of an example embodiment of the cylinder 507 of FIG. 5C. In the example embodiment of FIG. 5D, the height 513 of the cylinder 507 in FIG. 5C has been reduced to the height 513'. In this case, the CAD diagram coordinate system location of the target face, that is, the geometric entity 515, changes in order to account for the reduction in height of the cylinder 507.

FIG. 5E is a CAD diagram of an example embodiment of a 3D object 525 with an extrude 526. According to an example embodiment, a 3D-link may target a 3D context, such as a geometric entity that is the top face 527 of the extrude 526. If a user decreases the height 533 of the extrude, then the top face 527 may have to be replaced by a copy of the top face 527, which is at a lesser height 533' relative to the height 533. A first unique identifier (not shown) of the top face 527 may be different from a second unique identifier (not shown) of the copy of the top face 527, such as the copy 527' of the top face disclosed below with regard to FIG. 5F. After such a height modification, the 3D-link which points to the older geometric entity, that is, the top face 527 of FIG. 5E, becomes invalid because the geometric entity it points to may no longer exist in the current 3D CAD model (i.e., as modified).

FIG. 5F is a CAD diagram of an example embodiment of the 3D object 525 of FIG. 5E with the extrude 526 having a reduced height 533' relative to the height 533 in FIG. 5E. In the example embodiment of FIG. 5F, the top face 527 of the extrude 526 of FIG. 5E has been replaced by the copy 527' which is at the lesser height 533'. It should be understood that the geometric entity is not limited to a top face and may be any type of geometric entity, such as the fillet 528 disclosed below with regard to FIGS. 5G and 5H, or other type of geometric entity.

FIG. 5G is a CAD diagram of an example embodiment of a 3D object 535 with the fillet 528. According to an example embodiment, the target geometric entity of the 3D-link may be the fillet 528. If a user decreases radius of the fillet 528, then the fillet 528 may be replaced by a new fillet with a smaller radius, such as the new fillet 528' disclosed below with regard to FIG. 5H. Respective unique identifiers of the fillet 528 and new fillet 528' may be different from each other.

FIG. 5H is a CAD diagram of an example embodiment of the 3D object 535 of FIG. 5G with a new fillet 528'. After such a modification, the 3D-link which points to the older geometric entity, that is, the fillet 528 of FIG. 5G, becomes invalid because the geometric entity that the 3D-link points to no longer exists in the 3D CAD model. According to an example embodiment, a 3D-link attribute or 3D-link feature, such as the 3D-link feature 152 associated with the 3D-link 110, disclosed above with reference to FIGS. 1A-C, may be employed to resolve same.

For example, referring back to FIGS. 1A-C, as soon as the 3D CAD model 106 undergoes some modification that causes a geometric entity to be replaced by a new one, most modern CAD systems have in-built mechanisms that responsively transfer an attribute attached to the old geometric entity to the new geometric entity. Such known (or equivalent) techniques may be used to allow the 3D-link 110 to remain unchanged. If the "core 3D address" of the 3D-link 100 contains the entity-path, as disclosed above, then the 3D CAD system 104*a*, *b* may additionally update the entity-path to have it point to the new geometric entity as soon as the attribute is transferred.

Most modern CAD systems implement the functionality to perform feature tree update, also alternatively called feature tree rebuild, in the event of geometry modification that ensures that all the features affected by the geometry modification are rebuilt to make sure that they map to the correct updated geometric entities. This mechanism (known or common techniques and equivalents) may be employed to automatically update, appropriately, the 3D-link feature 152 as well, ensuring that the 3D-link feature 152 points to the new geometric entity.

In some cases, the variable link 118, stored as an entry in the database 108, may need to be updated in order to keep it up-to-date with the modification to the 3D CAD model 106. Specifically, the "core 3D address" in the variable link 118 may need to be updated. For example, if the "core 3D address" of the variable link 118 contains an entity-path, as disclosed above, then the CAD system 104*a*, *b* may need to update the entity-path in the "core 3D address" of the variable link 118 to have it point to the new geometric entity. Also, if the "core 3D address" of the variable link 118 contains the identifier of the 3D-link attribute or 3D-link feature 152, and if the 3D CAD system modifies respective identifiers of same when the 3D CAD model 106 is modified, then the 3D CAD system may need to update the identifier in the "core 3D address" of the variable link 118 to have it point to the new identifier.

With reference to FIG. 1A, according to an example embodiment, updating the "core 3D address" in the variable link 118 that is stored in the 3D-link database, that is, the database 108, may include fetching the static link 116 from the meta-data of the 3D-link attribute or 3D-link feature 152, querying the 3D-link database with the static link 116 as a key, accessing the corresponding database entry, and updating the "core 3D address" in the variable link 118 that is stored in that database entry. As such, the static link 116 stored as meta-data with the 3D-link attribute or the 3D-link feature 152 may be employed in keeping the 3D-link database, that is, the database 108, up-to-date.

There are, however, cases in which the 3D-link 110 does not need to be managed even though a modification to the 3D CAD model 106 has been made. For non-limiting example, the 3D-link 110 may be locked to a specific frozen version of a 3D CAD model 106 and, thus, does not need to be managed, because any modification to the 3D CAD model 106 will only cause a newer version of same to be created/modified without affecting the specific frozen version. Further, if the target 3D context 112 of a 3D-link 110 is a fixed 3D point, then the 3D-link 110 does not need to be managed because a fixed 3D point (fixed in coordinate system location) is not affected by any modification to the 3D CAD model 106, as disclosed above with regard to FIG. 5A and FIG. 5B.

According to an example embodiment, opening the 3D-link 110 may include navigating to the target 3D context 112 of the 3D-link 110 in response to the user providing the 3D-link 110 to the 3D CAD system. The 3D-link 110 may be provided, such as disclosed below, however, is not limited to same.

According to an example embodiment, in case of native CAD applications, the 3D CAD system, such as the first 3D CAD system 104*a* or second 3D CAD system 104*b*, may provide an input field into which a user, such as the first user 102*a* or second user 102*b*, can feed in the 3D-link 110, expressed as a text string, such as disclosed above. According to an example embodiment, in case of CAD web apps, such as SOLIDWORKS® xDesign or another CAD web app, the user may click on (or otherwise interactively select) the 3D-link 110 from another application, such as an email client, web browser, or other application. On clicking the 3D-link 110, a web browser may open, if not already open, and such web browser may establish a connection with a system, such as a server (not shown), whose address is embedded in the 3D-link 110. The 3D CAD system may, in turn, receive the 3D-link 110 and may extract the model address of the 3D CAD model from the 3D-link 110.

The 3D CAD system may extract the name of the CAD web application, if available, in the model address. If the name of the CAD web application is not available in the model address, then the 3D CAD system may choose a pre-determined CAD web application based on a type of the 3D CAD model or based on any other meta-data associated with the 3D CAD model.

The system may open the CAD web application. The CAD web application may be provided with the 3D-link 110. The CAD web application may split the 3D-link into its individual components/portions, namely the "model address," "core 3D address," and "view parameters," if present. The CAD web application may access the "model address" and open the 3D CAD model 106. The CAD web application may use the "view parameters" to set the pose of the camera and the view conditions to display the obtained 3D CAD model 106. Alternatively, default view parameters may be employed. The CAD web application may, optionally, highlight or show the 3D-link indicator 114, such as a pin or other visual indicator, at the 3D context 112, that is, a geometric entity or the 3D point specified by the 'core 3D address.'

An example embodiment provides a security aspect for the 3D CAD model 106. For example, the user clicking on the 3D-link 110 may be asked to be logged into the 3D CAD system before the 3D CAD system opens the 3D CAD model 106. If the user does not have the authority or access rights to view the 3D CAD model 106, then the 3D CAD model 106 would not be opened and an "access denied" message may be shown to the user.

According to an example embodiment, accessing the target of the 3D-link 110 may fail if the 3D-link 110 becomes invalid, which can happen, for example, if the target 3D CAD model 106 has been deleted from the CAD model database or if the 3D CAD model 106 has been modified in such a manner that the target geometric entity, that is, the 3D context, is no longer present in the 3D CAD model 106 as discussed above with regard to FIGS. 5A-5H.

Figure 6:
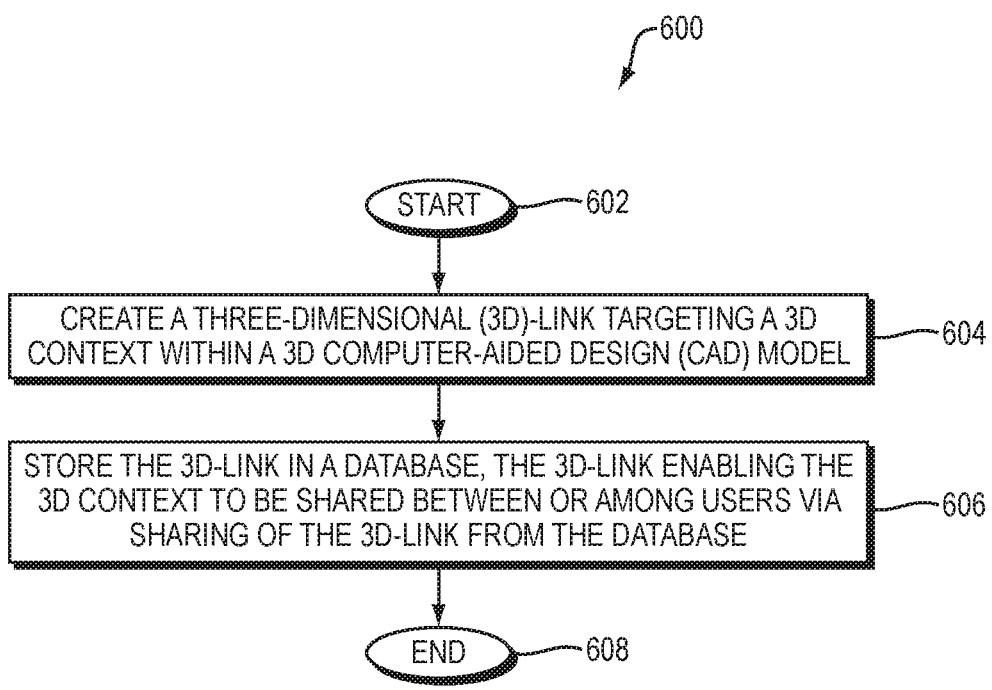
FIG. 6 is a flow diagram of an example embodiment of a computer-implemented method for sharing a 3D context of a 3D CAD model.

FIG. 6 is a flow diagram 600 of an example embodiment of a computer-implemented method for sharing a three-dimensional (3D) context of a 3D computer-aided design (CAD) model. The method begins (602) and creates a 3D-link targeting the 3D context within the 3D CAD model, the creating including forming a static link and a variable link (604). The static link is configured to re-direct to the variable link in response to a user opening the 3D-link. The variable link enables (i) the 3D CAD model to be located and opened, and (ii) the 3D context to be displayed within the 3D CAD model. The method stores the 3D-link in a database, the 3D-link enabling the 3D context to be shared between or among users via sharing of the 3D-link from the database (606), and the method thereafter ends (608) in the example embodiment.

The computer-implemented method may further comprise storing the 3D CAD model in the database. Forming the static link may include concatenating a database address of the database and a unique identifier of the variable link.

The database may be a 3D-link database. The 3D CAD model may be stored in a 3D CAD model database. Forming the static link may include concatenating a database address of the 3D-link database and a unique identifier of the variable link. The variable link may include a model address of the 3D CAD model stored in the 3D CAD model database.

Forming the variable link may include concatenating: a model address including an address of the 3D CAD model and (i) a core 3D address of the 3D context within the 3D CAD model, the core 3D address being relative to the model address, or (ii) a unique identifier of a 3D-link attribute or 3D-link feature, wherein the core 3D address is included as meta-data within the 3D-link attribute or 3D-link. The 3D-link attribute may be attached onto a 3D point or geometric entity of the 3D CAD model.

Forming the variable link may further include concatenating at least one view parameter or including the at least one view parameter in the meta-data, the at least one view parameter defining a pose of a camera, view condition, or a combination thereof. The at least one view parameter is optional because a user can open the 3D CAD model in a "default view."

The computer-implemented method may further comprise enabling a user to specify that the 3D-link is to be locked to a given version or revision of the 3D CAD model. In an event the 3D-link is specified to be locked, the model address may further include the given version of revision of the 3D CAD model.

The storing may include entering the 3D-link into the database as a key-value pair, wherein the key-value pair includes a key and a value, wherein the static link is the key, and wherein the variable link is the value.

In an event a change is made to the 3D CAD model following creation of the 3D-link, the computer-implemented method may further comprise updating the variable link, automatically, in response to the change made, prompting for user input in an event the change causes the 3D context to become invalid, or a combination thereof. The variable link may be updated, automatically, based on an attribute transfer mechanism and feature update/rebuild mechanism that most CAD systems provide, such as disclosed above.

Figure 7:
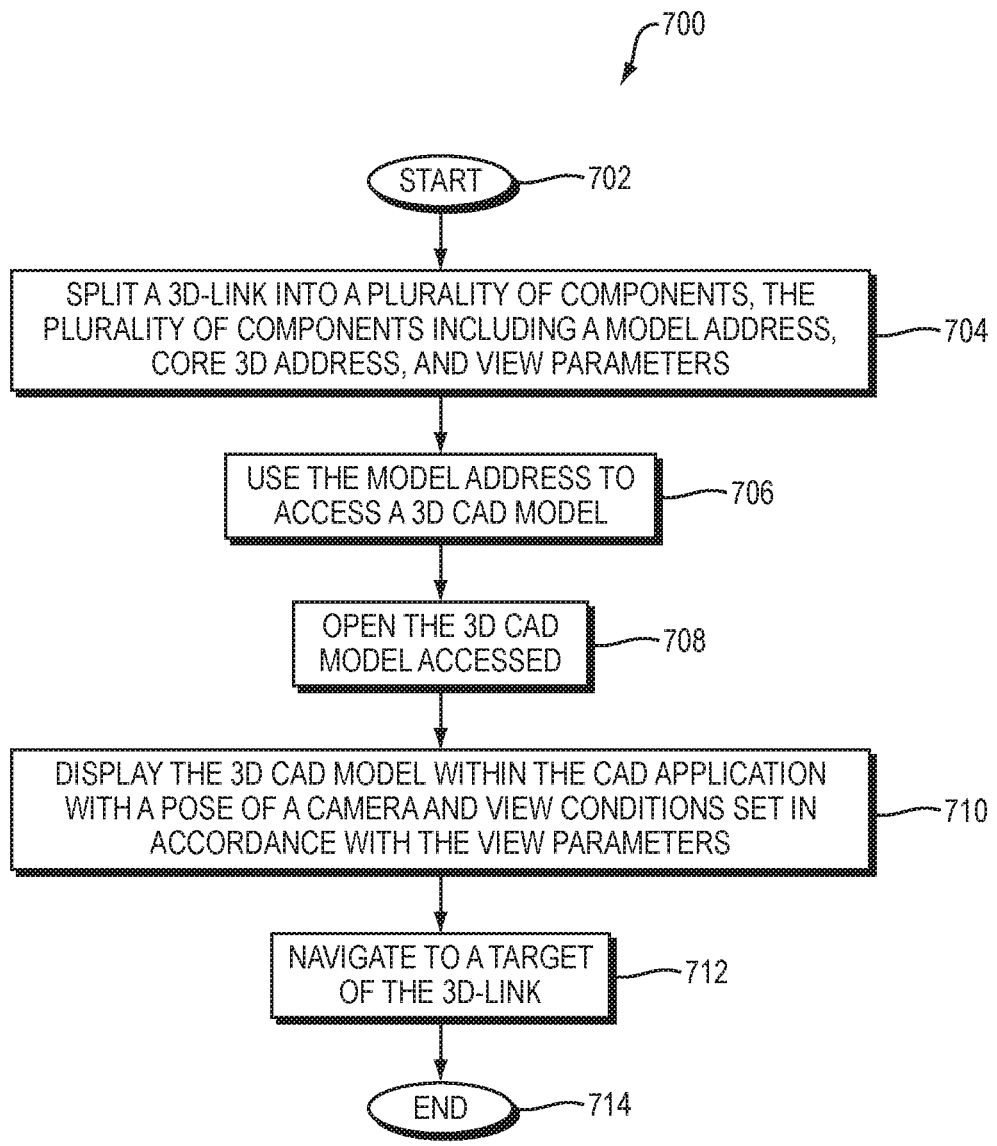
FIG. 7 is a flow diagram of an example embodiment of a computer-implemented method for navigating to a target of a 3D-link from within a CAD application.

FIG. 7 is a flow diagram 700 of an example embodiment of a computer-implemented method for navigating to a target, such as a point or geometric entity, of a three-dimensional (3D)-link from within a computer-aided design (CAD) application. The computer-implemented method begins (702) with respect to a given or received 3D-link and splits (704) the 3D-link into a plurality of components/portions. The plurality of components/portions include a model address, a core 3D address, and view parameters. The computer-implemented method 700 uses the model address to access a 3D CAD model (706). The method 700 opens the 3D CAD model accessed (708). The method displays the accessed 3D CAD model within the CAD application with a pose of a virtual camera and view conditions set in accordance with the view parameters (710). The computer-implemented method navigates (712) to the target of the given 3D-link by displaying an icon at a geometric entity or 3D point of the accessed 3D CAD model or highlighting the geometric entity or 3D point, the geometric entity or 3D point being specified by the core 3D address. The computer-implemented method thereafter ends (714) in the example embodiment.

According to an example embodiment, a non-transitory computer-readable medium may have encoded thereon a sequence of instructions which, when loaded and executed by at least one processor, causes the at least one processor to perform the computer-implemented method 700 of FIG. 7.

The CAD application may be a CAD web application and a name of the CAD web application may be included in the model address. The CAD application may be a CAD web application selected based on a type of the 3D CAD model or meta-data associated with the 3D CAD model.

The 3D-link may be expressed as a text string and the 3D-link may be provided to the CAD application via an input field of the CAD application, the input field enabling the 3D-link to be entered by a user.

The 3D-link may be provided to the CAD web application in response to a user clicking on/interactively selecting the 3D-link from within another application. It should be understood, however, that the CAD application is not limited to a web application. For example, a web browser may provide a native app that is launched with the 3D-link text string as an argument. According to an example embodiment, the clicking/user selecting may cause the web browser to establish a connection to a server and provide the 3D-link to the server, an address of the server embedded in the 3D-link, and wherein the CAD web application is opened by the server.

The geometric entity may include a feature in the 3D CAD model, geometry belonging to the feature, reference plane included in the 3D CAD model, reference line included in the 3D CAD model, reference point included in the 3D CAD model, sketch included in the 3D CAD model, dimension element on the sketch or on a 3D solid included in the 3D CAD model, annotation element on the sketch or on the 3D solid, or a combination thereof.

Figure 8:
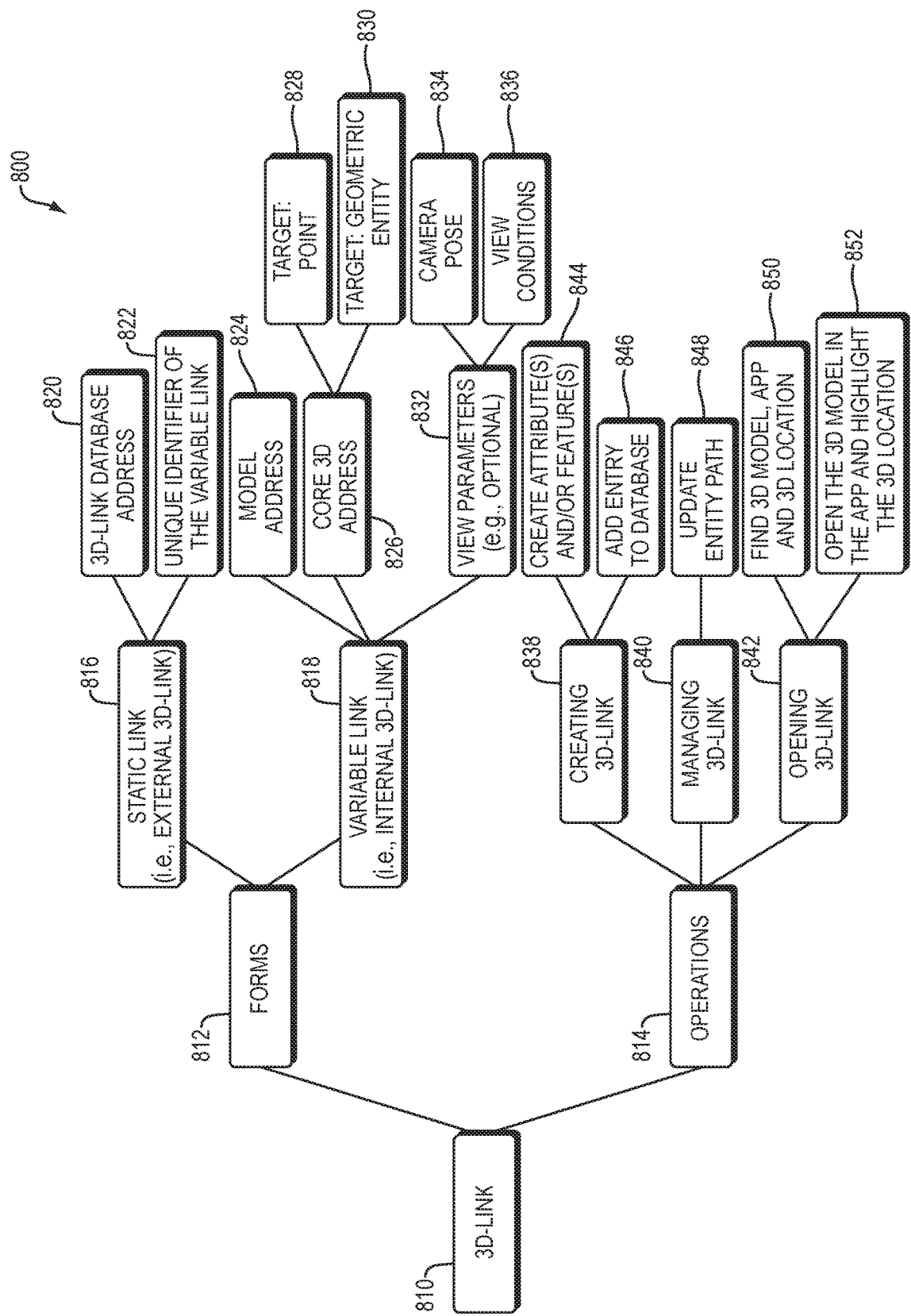
FIG. 8 is a block diagram of an example embodiment of a 3D-link.

FIG. 8 is a block diagram 800 of a non-limiting example embodiment of a 3D-link 810 and supporting logic structure in software for implementing the same. As shown in the block diagram 800, the 3D-link 810 may include multiple forms 812 of links and multiple operations 814 may be performed with respect to the 3D-link 810. For example, the 3D-link 810 may include a static link 816, also referred to interchangeably herein as an external link or external 3D-link, and a variable link 818, also referred to interchangeably herein as an internal link or internal 3D-link. The static link 816 may include a 3D-link database address 820 and a unique identifier 822 of the variable link 818.

The variable link 818 includes a model address 822 and core 3D address 826 of the 3D context targeted by the 3D-link 810. The 3D context, that is, the target, may be a point 828 or geometric entity 830 of the 3D CAD model.

The variable link 818, may further include, optionally, view parameters 832. The view parameters 832 may include camera pose 834, view conditions 836, or a combination thereof.

The operations 814 that may be performed with respect to the 3D-link 810 include creating 838, managing 840, and opening 842 the 3D-link 810. It should be understood that operations 814 with respect to the 3D-link 810 are not limited thereto. Creating 838 the 3D-link 810 may include creating 844 an attribute(s) and/or feature(s) and adding 846 an entry for the 3D-link 810 to the 3D-link database. Managing 840 the 3D-link 810 may include updating 848 an entity path, as disclosed above. Opening 842 the 3D-link 810 may include locating 850 the 3D model, app, and 3D location of the target. Opening 842 the 3D-link 810 may further include opening the 3D model in the app and highlighting the 3D location 852.

FIG. 9 is a block diagram of an example of the internal structure of a computer 900 in which various embodiments of the present disclosure may be implemented. The computer 900 contains a system bus 902, where a bus is a set of hardware lines used for data transfer among the components of a computer or digital processing system. The system bus 902 is essentially a shared conduit that connects different elements of a computer system (e.g., processor, disk storage, memory, input/output ports, network ports, etc.) that enables the transfer of information between the elements. Coupled to the system bus 902 is an I/O device interface 904 for connecting various input and output devices (e.g., keyboard, mouse, displays, printers, speakers, etc.) to the computer 900. A network interface 906 allows the computer 900 to connect to various other devices attached to a network (e.g., global computer network, wide area network, local area network, etc.). Memory 908 provides volatile or non-volatile storage for computer software instructions 910 and data 912 that may be used to implement embodiments of the present disclosure, where the volatile and non-volatile memories are examples of non-transitory media. Disk storage 914 provides non-volatile storage for computer software instructions 910 and data 912 that may be used to implement embodiments of the present disclosure. A central processor unit 918 is also coupled to the system bus 902 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 9, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for sharing a three-dimensional (3D) context of a 3D computer-aided design (CAD) model, the computer-implemented method comprising:
    creating a 3D-link targeting the 3D context within the 3D CAD model, the creating including forming a static link and a variable link, the static link configured to re-direct to the variable link in response to a user opening the 3D-link, the variable link enabling (i) the 3D CAD model to be located and opened and (ii) the 3D context to be displayed within the 3D CAD model; and
    storing the 3D-link in a database, the 3D-link enabling the 3D context to be shared between or among users via sharing of the 3D-link from the database.

2. The computer-implemented method of claim 1, wherein:
    features of the 3D CAD model are organized in a feature tree;
    the feature tree includes a 3D-link feature for the 3D-link created; and
    the 3D-link feature enables editing of placement of a 3D-link indicator representing the 3D-link within the 3D CAD model to change the 3D context targeted, enables editing of at least one requirement of the 3D-link, provides a rollback point in a history of the 3D CAD model, enables storage of user-editable information related to the 3D context, or a combination thereof.

3. The computer-implemented method of claim 1, wherein the 3D CAD model is associated with a coordinate system and wherein the 3D context is a fixed 3D point specified by x, y, and z coordinates expressed in the coordinate system of the 3D CAD model.

4. The computer-implemented method of claim 1, wherein the 3D-link is expressed as a text string, wherein the 3D context is a geometric entity of the 3D CAD model, wherein the static link is smaller relative to the variable link, or a combination thereof.

5. The computer-implemented method of claim 4, wherein the geometric entity includes a feature in the 3D CAD model, geometry belonging to the feature, reference plane included in the 3D CAD model, reference line included in the 3D CAD model, reference point included in the 3D CAD model, sketch included in the 3D CAD model, dimension element on the sketch or on a 3D solid included in the 3D CAD model, annotation element on the sketch or on the 3D solid, or a combination thereof.

6. The computer-implemented method of claim 1, further comprising storing the 3D CAD model in the database and wherein forming the static link includes concatenating a database address of the database and a unique identifier of the variable link.

7. The computer-implemented method of claim 1, wherein the database is a 3D-link database, wherein the 3D CAD model is stored in a 3D CAD model database, and wherein forming the static link includes concatenating a database address of the 3D-link database and a unique identifier of the variable link, the variable link including a model address of the 3D CAD model stored in the 3D CAD model database.

8. The computer-implemented method of claim 1, wherein forming the variable link includes concatenating:
    a model address including an address of the 3D CAD model; and
    (i) a core 3D address of the 3D context within the 3D CAD model, the core 3D address being relative to the model address, or (ii) a unique identifier of a 3D-link attribute or 3D-link feature, wherein the core 3D address is included as meta-data within the 3D-link attribute or 3D-link feature, and wherein the 3D-link attribute is attached onto a 3D point or geometric entity of the 3D CAD model.

9. The computer-implemented method of claim 8, wherein the model address further includes an identifier of a web-based CAD application within which the 3D CAD model is to be opened in response to opening of the 3D-link.

10. The computer-implemented method of claim 8, further comprising enabling a user to specify that the 3D-link is to be locked to a given version or revision of the 3D CAD model and wherein, in an event the 3D-link is specified to be locked, the model address further includes the given version of revision of the 3D CAD model.

11. The computer-implemented method of claim 1, wherein the storing includes entering the 3D-link into the database as a key-value pair, wherein the key-value pair includes a key and a value, wherein the static link is the key, and wherein the variable link is the value.

12. The computer-implemented method of claim 1, wherein, in an event a change is made to the 3D CAD model following creation of the 3D-link, the computer-implemented method further comprises updating the variable link, automatically, in response to the change made, prompting for user input in an event the change causes the 3D context to become invalid, or a combination thereof.

13. A computer-aided design (CAD) system configured to:
    open a 3D computer-aided design (CAD) model;
    enable a user to select a 3D context of the 3D CAD model opened;
    create a 3D-link targeting the 3D context, the 3D-link including a static link and a variable link, the static link configured to re-direct to the variable link in response to opening of the 3D-link, the variable link enabling (i) the 3D CAD model to be located and opened and (ii) the 3D context to be displayed within the 3D CAD model; and
    store the 3D-link in a 3D-link database communicatively coupled to the CAD system, the 3D-link enabling the 3D context to be shared between or among users via sharing of the 3D-link from the 3D-link database.

14. The system of claim 13, wherein the CAD system includes a display screen configured to display the 3D CAD model opened, wherein the 3D context is a 3D point or geometric entity, and wherein, to enable the user to select the 3D context, the CAD system is further configured to enable the user to drop a pin, flag, or bookmark icon onto the 3D point or geometric entity, the 3D point or geometric entity displayed on the display screen.

15. The system of claim 14, wherein the CAD system is further configured to attach a 3D-link attribute onto the 3D point or geometric entity or reference the 3D point or geometric entity via a 3D-link feature for the 3D-link, the 3D-link feature included in a feature tree of the 3D CAD model.

16. The system of claim 15, wherein static link is a text string and wherein the CAD system is further configured to add the text string of the static link as meta-data to the 3D-link attribute or 3D-link feature enabling the static link to be used as a key for accessing the variable link in the 3D-link database.

17. The system of claim 13, wherein the CAD system includes a display screen configured to display the 3D CAD model opened, wherein the CAD system is further configured to form the variable link by concatenating:
   a model address including an address of the 3D CAD model; and
   (i) a core 3D address of the 3D context within the 3D CAD model, the core 3D address being relative to the model address, or (ii) a unique identifier of a 3D-link attribute or 3D-link feature, wherein the core 3D address is included as meta-data within the 3D-link attribute or 3D-link feature, and wherein the 3D-link attribute is attached onto a 3D point or geometric entity of the 3D CAD model.

18. The system of claim 13, wherein the CAD system is further configured to store the 3D-link in the 3D-link database by entering the 3D-link into the 3D-link database as a key-value pair, wherein the key-value pair includes a key and a value, wherein the static link is the key, and wherein the variable link is the value.

19. The system of claim 13, wherein the 3D CAD model is stored in a 3D CAD model database, wherein the 3D-link database and 3D CAD model database are hosted by a common cloud environment, and wherein the CAD system is configured to access the 3D-link database using a given user authentication, the given user authentication used to open a 3D CAD model stored in the 3D CAD model database.

20. A non-transitory computer-readable medium for navigating to a target of a three-dimensional (3D)-link from within a computer-aided design (CAD) application, the non-transitory computer-readable medium having encoded thereon a sequence of instructions which, when loaded and executed by at least one processor, causes the at least one processor to:
   split the 3D-link into a plurality of components, the plurality of components including a model address, core 3D address, and view parameters;
   use the model address of the 3D-link to access a 3D CAD model;
   open the 3D CAD model accessed;
   display the 3D CAD model within the CAD application with a pose of a camera and view conditions set in accordance with the view parameters of the 3D-link; and
   navigate to the target of the 3D-link by displaying an icon at a geometric entity or 3D point of the 3D CAD model or highlighting the geometric entity or 3D point, the geometric entity or 3D point specified by the core 3D address of the 3D-link.

\* \* \* \* \*